United States Patent
Dong et al.

(10) Patent No.: US 12,535,943 B2
(45) Date of Patent: Jan. 27, 2026

(54) INTERACTION METHOD AND APPARATUS, ELECTRONIC DEVICE AND COMPUTER READABLE MEDIUM

(71) Applicant: DOUYIN VISION CO., LTD., Beijing (CN)

(72) Inventors: Shiwei Dong, Beijing (CN); Yan Liu, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 18/358,656

(22) Filed: Jul. 25, 2023

(65) Prior Publication Data

US 2024/0028189 A1    Jan. 25, 2024

(30) Foreign Application Priority Data

Jul. 25, 2022    (CN) .......................... 202210878668.0

(51) Int. Cl.
   *G06F 3/04847*    (2022.01)

(52) U.S. Cl.
   CPC ................................. *G06F 3/04847* (2013.01)

(58) Field of Classification Search
   CPC .................................................. G06F 3/04847
   See application file for complete search history.

(56) References Cited

U.S. PATENT DOCUMENTS

| | | | | |
|---|---|---|---|---|
| 10,222,958 B2 * | 3/2019 | Patel | ............... | G11B 27/036 |
| 2018/0098028 A1 * | 4/2018 | Mu | ................... | H04N 21/2187 |
| 2018/0345129 A1 * | 12/2018 | Rathod | ............... | H04W 4/029 |
| 2019/0075340 A1 * | 3/2019 | Hochart | ............ | H04N 21/4882 |

(Continued)

FOREIGN PATENT DOCUMENTS

| | | |
|---|---|---|
| CN | 107172497 A | 9/2017 |
| CN | 107547947 A | 1/2018 |

(Continued)

OTHER PUBLICATIONS

ISA China National Intellectual Property Administration, International Search Report and Written Opinion Issued in Application No. PCT/CN2023/109005, Oct. 12, 2023, WIPO, 18 pages.

(Continued)

*Primary Examiner* — Anil K Bhargava
(74) *Attorney, Agent, or Firm* — Alleman Hall & Tuttle LLP

(57) ABSTRACT

An interaction method and apparatus, an electronic device and a computer readable medium are provided. The method includes: for an electronic device used by any participant in a live room, when at least one candidate user display interface is displayed on a live video page displayed by the electronic device, after the electronic device receives a trigger operation on a target user display interface in the candidate user display interfaces, the electronic device may display an interaction interface on the live video page, and some virtual gifts are deployed on the interaction interface. After receiving a trigger operation on a target gift in the virtual gifts, the electronic device may send the target gift to a client corresponding to the target user display interface, and thus the client corresponding to the target user display interface is able to receive the gift from the participant through the live video page.

15 Claims, 7 Drawing Sheets

(56) References Cited

U.S. PATENT DOCUMENTS

| | | | | |
|---|---|---|---|---|
| 2019/0080375 A1* | 3/2019 | Alvarez | ................ | H04N 7/147 |
| 2020/0042166 A1* | 2/2020 | Burns | ................ | G06F 3/04845 |
| 2021/0021663 A1* | 1/2021 | Zhou | ................ | H04N 21/4781 |
| 2021/0065682 A1* | 3/2021 | Li | ................ | H04N 7/157 |
| 2021/0394052 A1 | 12/2021 | Kanaya | | |
| 2022/0191557 A1* | 6/2022 | Zhang | ................ | G06Q 30/0201 |
| 2022/0329877 A1* | 10/2022 | Zhang | ................ | H04L 12/1818 |
| 2022/0417566 A1* | 12/2022 | Tang | ................ | H04N 21/4312 |

FOREIGN PATENT DOCUMENTS

| | | | |
|---|---|---|---|
| CN | 108230028 | A | 6/2018 |
| CN | 109618191 | A | 4/2019 |
| CN | 111147877 | * | 5/2020 |
| CN | 111147877 | A | 5/2020 |
| CN | 111163326 | A | 5/2020 |
| CN | 111225226 | A | 6/2020 |
| CN | 112565665 | A | 3/2021 |
| CN | 112714330 | A | 4/2021 |
| CN | 113438490 | A | 9/2021 |
| CN | 115052169 | A | 9/2022 |

OTHER PUBLICATIONS

China National Intellectual Property Administration, Office Action and Search Report Issued in Application No. 202210878668.0, Jul. 16, 2024, 15 pages.

* cited by examiner

_(1)_

INTERACTION METHOD AND APPARATUS, ELECTRONIC DEVICE AND COMPUTER READABLE MEDIUM

This application claims priority to Chinese Patent Application No. 202210878668.0, titled "INTERACTION METHOD AND APPARATUS, ELECTRONIC DEVICE AND COMPUTER READABLE MEDIUM", filed on Jul. 25, 2022, which is hereby incorporated by reference in its entirety.

FIELD

The present disclosure relates to the technical field of Internet, and in particular to an interaction method and apparatus, an electronic device and a computer readable medium.

BACKGROUND

Live streaming is a kind of information publishing mode through the network which produces and publishes information synchronously with the occurrence and development of an event on the spot and has a two-way circulation process.

In some scenarios, an anchor in a live room invites some audiences to co-host in real time, so that other audiences in the live room may receive not only audio data (and/or video data) of the anchor, but also audio data (and/or video data) of these co-hosting guests. The co-hosting guests refer to live viewers who successfully communicate with the anchor by co-hosting. s ting However, the existing live streaming co-hosting solution still has the problems that an interaction operation of a gift is relatively complicated and inconvenient, which affects a user experience.

SUMMARY

To solve the above technical problems, an interaction method and apparatus, an electronic device and a computer readable medium are provided according to the present disclosure, which can improve a user experience.

To realize the above objectives, the following technical solutions are provided according to embodiments of the present disclosure.

An interaction method is provided according to an embodiment of the present disclosure. The method includes:
  displaying a live video page, where the live video page includes at least one candidate user display interface;
  displaying an interaction interface on the live video page in response to a trigger operation on a target user display interface in the at least one candidate user display interface, where the interaction interface includes at least one virtual gift; and
  sending a target gift in the at least one virtual gift to a user end corresponding to the target user display interface, in response to a trigger operation on the target gift.

In a possible embodiment, the interaction interface further includes at least one management control.
  The method further includes:
  adjusting state information of the client corresponding to the target user display interface, in response to a trigger operation on a to-be-used control in the at least one management control.

In a possible embodiment, the interaction method is applied to an anchor end of a live streaming; and the at least one management control includes at least one of: at least one co-hosting presentation state adjustment control, a becoming-audience control and an operation selection control.

In a possible embodiment, the adjusting state information of the client corresponding to the target user display interface, in response to a trigger operation on a to-be-used control in the at least one management control includes:
  adjusting a co-hosting presentation state corresponding to the target user display interface on the live video page, in response to a trigger operation on a target control in the at least one co-hosting presentation state adjustment control.

In a possible embodiment, the adjusting a co-hosting presentation state corresponding to the target user display interface on the live video page includes:
  adjusting the co-hosting presentation state corresponding to the target user display interface from a first co-hosting state to a second co-hosting state on the live video page, in a case that the target control is in a first display state, where the target control is a video control, the first display state indicates that the client corresponding to the target user display interface is in a camera enabling state, the first co-hosting state includes a camera enabling state, and the second co-hosting state includes a camera disabling state; or the target control is a voice control, the first display state indicates that the client corresponding to the target user display interface is in a microphone enabling state, the first co-hosting state includes a microphone enabling state, and the second co-hosting state includes a microphone disabling state; and/or
  sending a co-hosting presentation state adjustment request to the client corresponding to the target user display interface, in a case that the target control is in a second display state, where the co-hosting presentation state adjustment request is used to request that the co-hosting presentation state corresponding to the target user display interface is adjusted from a third co-hosting state to a fourth co-hosting state; the target control is a video control, the second display state indicates that the client corresponding to the target user display interface is in a camera disabling state, the third co-hosting state includes a camera disabling state, and the fourth co-hosting state includes a camera enabling state; or the target control is a voice control, the second display state indicates that the client corresponding to the target user display interface is in a microphone disabling state, the third co-hosting state includes a microphone disabling state, and the fourth co-hosting state includes a microphone enabling state.

In a possible embodiment, the adjusting state information of the client corresponding to the target user display interface in response to a trigger operation on a to-be-used control in the at least one management control includes:
  displaying becoming-audience confirmation information in response to a trigger operation on the becoming-audience control; and
  removing display of the target user display interface from a video play page, in response to a preset operation triggered for the becoming-audience confirmation information.

In a possible embodiment, the adjusting state information of the client corresponding to the target user display interface in response to a trigger operation on a to-be-used control in the at least one management control includes:

displaying at least one candidate operation option, in response to a trigger operation on the operation selection control; and adjusting user description information of the target user display interface, in response to a selection operation on a target option in the at least one candidate operation option.

In a possible embodiment, the at least one co-hosting presentation state adjustment control includes at least one of a video control and a voice control.

In a possible embodiment, the at least one management control is determined based on live room role description information of a client corresponding to the live video page.

In a possible embodiment, in a case that a preset display condition is satisfied, the interaction interface further includes a following state adjustment control.

The method further includes:

establishing a following relationship and removing display of the following state adjustment control on the live video page in response to a trigger operation on the following state adjustment control, where the following relationship indicates that a client corresponding to the live video page has followed the client corresponding to the target user display interface.

In a possible embodiment, the interaction interface further includes a user identification corresponding to the target user display interface.

The method further includes:

displaying an information introduction page corresponding to the user identification, in response to a trigger operation on the user identification.

In a possible embodiment, the interaction method is applied to a first client; the at least one candidate user display interface includes a candidate user display interface corresponding to the first client and a candidate user display interface corresponding to at least one second client; and the displaying an interaction interface on the live video page, in response to a trigger operation on a target user display interface in the at least one candidate user display interface includes:

displaying the interaction interface on the live video page, in response to a trigger operation on a target user display interface in the candidate user display interface corresponding to the at least one second client.

An interaction apparatus is further provided according to an embodiment of the present disclosure. The interaction apparatus includes a first display unit, a second display unit and a third display unit.

The first display unit is configured to display a live video page, where the live video page includes at least one candidate user display interface.

The second display unit is configured to display an interaction interface on the live video page in response to a trigger operation on a target user display interface in the at least one candidate user display interface, where the interaction interface includes at least one virtual gift.

The third display unit is configured to send a target gift in the at least one virtual gift to a client corresponding to the target user display interface, in response to a trigger operation on the target gift.

An electronic device is further provided according to an embodiment of the present disclosure. The device includes a processor and a memory.

The memory is configured to store instructions or computer programs.

The processor is configured to perform the instructions or the computer programs in the memory, to cause the electronic device to perform any embodiment of the interaction method according to the embodiments of the present disclosure.

A computer readable medium is further provided according to an embodiment of the present disclosure. The computer readable medium stores instructions or computer programs. The instructions or the computer programs, when executed on a device, cause the device to perform any embodiment of the interaction method according to the embodiments of the present disclosure.

BRIEF DESCRIPTION OF THE DRAWINGS

In order to more clearly illustrate technical solutions in the embodiments of the present disclosure or in the conventional technology, the drawings to be used in the description of the embodiments or in the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

Figure 1:
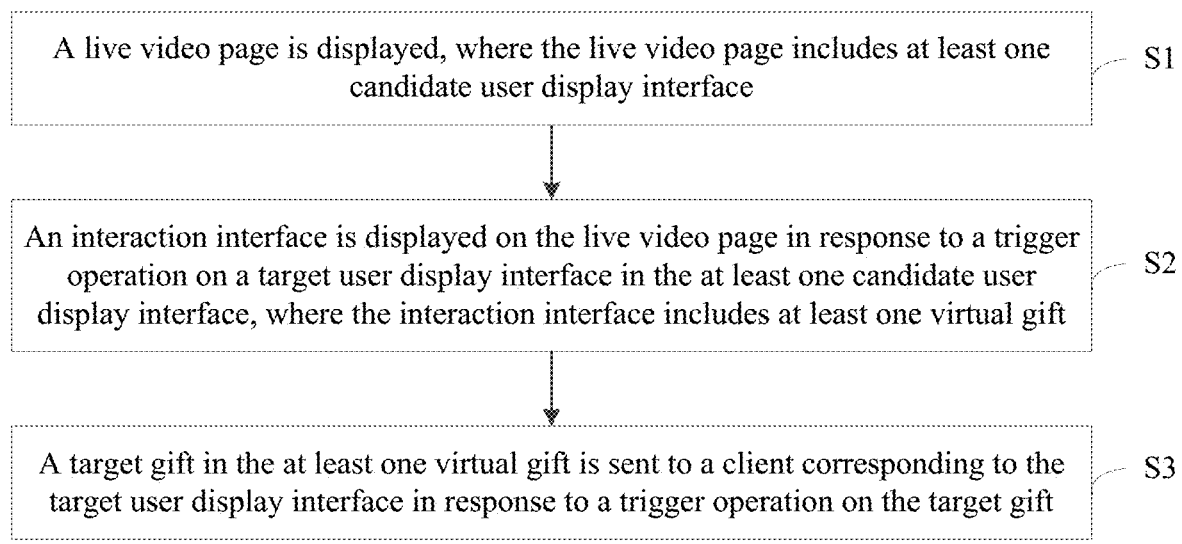
FIG. 1 is a schematic diagram of an interaction method according to an embodiment of the present disclosure.

In order to understand the technical solutions according to the present disclosure, some technical terms related to the present disclosure are first introduced below.

A live viewer refers to a person who watches a live room by means of an electronic device. That is, the live viewer refers to other users in the live room except an anchor.

A co-hosting guest refers to a live viewer who successfully communicate with the anchor in the live room by co-hosting. In addition, the co-hosting guest is not limited in the embodiments of the present disclosure. For example, in some application scenarios (for example, a scenario for communicating with at least one anchor by co-hosting), the co-hosting guest may be an anchor in other live room. For another example, in some application scenarios (for example, a scenario in which one anchor communicates with a user by co-hosting), the co-hosting guest may be the user (rather than the anchor). It can be seen that, a co-hosting guest in a first live room may be an anchor in a second live room, or a user who is watching the first live room. The second live room is different from the first live room.

An audience refers to a live viewer who is not in a co-hosting state in the live room.

An anchor end of a live streaming refers to a client corresponding to the anchor (that is, a user end corresponding to the anchor) or an electronic device used by the anchor when live streaming.

A guest end is used to indicate an electronic device used by the co-hosting guest (that is, a client corresponding to the co-hosting guest).

An audience end is used to indicate an electronic device used by the audience (that is, a client corresponding to the audience).

Based on the above technical terms, the technical solutions according to the present disclosure are described below.

The inventor has found in his research on the live streaming co-hosting scenario that, in some cases, for a participant (for example, an anchor, a co-hosting guest, or an audience, etc.) in a live room, the participant may want to send a gift to a user (for example, the anchor or the co-hosting guest) displayed in the live room. However, due to defects of some live streaming co-hosting solutions, a gift sending process involved in the live streaming co-hosting solutions is complicated, which may lead to a poor gift sending experience for the participant in the live room. Thus, the participant may reduce or give up gift sending as much as possible, because they feels the gift sending operation so complicated. The participant refers to a user in the live room, which will not be limited in the embodiments of the present disclosure. For example, the participant may be the anchor, the co-hosting guest, or the audience, etc.

For convenience of understanding, one gift sending process is taken as an example for description below.

As an example, in the related technology, for a live streaming co-hosting scenario, if an audience in the live room wants to send a gift to a co-hosting guest, the audience is required to first click on an image of the co-hosting guest on a live video page, so as to display a panel with a gift logo on the live video page. Then, the audience may click on the gift logo on the panel, so that some usable virtual gifts appear on the live video page. Finally, the audience may choose a certain gift from the virtual gifts and send the selected gift to the co-hosting guest. Since the virtual gifts are in a secondary entrance of the panel, the audience cannot directly see and use them on the panel. The audience is required to perform some complicated operations to see and use the virtual gifts. As a result, a process for acquiring the virtual gifts is complicated, which leads to a high complexity of a process for sending the virtual gifts, and thus a gift sending enthusiasm of the audience is reduced.

Based on the above finding, in order to solve the technical problems shown in the background, an interaction method is provided according to an embodiment of the present disclosure. The method includes: for an electronic device used by any participant (for example, an anchor, a co-hosting guest or an audience) in a live room, when a live video page (for example, a live streaming co-hosting page) is displayed on the electronic device and the live video page includes at least one candidate user display interface (for example, an anchor display page, co-hosting display pages of respective co-hosting guests and the like), after the electronic device receives a trigger operation on a target user display interface (for example, a co-hosting display page of a certain co-hosting guest, etc.) in the candidate user display interfaces, the electronic device may display an interaction interface on the live video page, and some usable virtual gifts are deployed on the interaction interface. In this way, after receiving a trigger operation on a target gift in the virtual gifts, the electronic device may send the target gift to a client (for example, an anchor end of a live streaming or a guest end) corresponding to the target user display interface. Thus, the client corresponding to the target user display interface is able to receive the gift from the participant through the live video page. Therefore, a purpose of the participant sending the gift to the anchor or any co-hosting guest in the live room can be realized, and an interaction operation of the participant in sending the gift to the anchor or any co-hosting guest in the live room can be simplified. Thus, an interaction path can be shortened, interaction efficiency can be improved, so that a gift sending enthusiasm of the participant can be improved, and a user experience (especially a gift sending experience) of the participant can be improved.

In addition, an executing subject of the above interaction method is not limited in the embodiments of the present disclosure. For example, the interaction method according to the embodiment of the present disclosure may be executed by an electronic device. The electronic device includes, but is not limited to, smart phones, tablet computers, notebook computers, personal digital assistant (PDAs), etc.

In order to understand the solutions of the present disclosure better by those skilled in the art, the technical solutions of embodiments of the present disclosure are clearly and completely described below in conjunction with the drawings of the embodiments of the present disclosure. Apparently, the embodiments described below are only some embodiments of the present disclosure, rather than all the embodiments. Based on the embodiments of the present disclosure, all other embodiments obtained by those skilled in the art without any creative work fall within the scope of protection of the present disclosure.

In order to better understand the technical solutions according to the present disclosure, an interaction method according to an embodiment of the present disclosure is described below in conjunction with some drawings.

As shown in FIG. 1, an interaction method according to an embodiment of the present disclosure includes S1 to S3.

In S1, a live video page is displayed, where the live video page includes at least one candidate user display interface.

The live video page may refer to a live room page which may be seen by a live room user. For example, the live video page may be a live room co-hosting page (for example, a page 200 shown in FIG. 2).

The live room user may refer to a viewer of the live video page, which will not be limited in the embodiments of the present disclosure. For example, when the interaction method according to the embodiment of the present disclosure is applied to an anchor end of a live streaming, the live room user may be an anchor. For another example, when the interaction method according to the embodiment of the present disclosure is applied to a guest end corresponding to the n-th co-hosting guest, the live room user may be the n-th co-hosting guest, where n is a positive integer, $n \leq N$, N represents the number of co-hosting guests in the live room, and N is a positive integer. For another example, when the interaction method according to the embodiment of the present disclosure is applied to an audience end corresponding to the k-th audience, the live room user may be the k-th audience, where k is a positive integer, $k \leq K$, K represents the number of audiences in the live room, and K is a positive integer.

In addition, for a live streaming co-hosting scenario, the live video page may include at least one candidate user display interface. Moreover, the "at least one candidate user display interface" may include an anchor display page and co-hosting display pages of N co-hosting guests. The anchor display page may be a display window for the anchor, which is configured to display a real-time video stream of the anchor or an image preset by the anchor. The co-hosting display page may be a display window for a co-hosting user who communicates with the anchor by co-hosting, which is configured to display a real-time video stream of the co-hosting user or an image preset by the co-hosting user. The anchor display page is configured to display a co-hosting presentation state of the anchor in the live room, for example, an on/off state of a voice, and an on/off state of a camera. The co-hosting display page of the n-th co-hosting guest is configured to display a co-hosting presentation state of the n-th co-hosting guest in the live room, for example, an on/off state of a voice, and an on/off state of a camera, where n is a positive integer, n≤N, N is a positive integer, and N represents the number of co-hosting guests in the live room. For convenience of understanding, description is made below in conjunction with an example.

Figure 2:
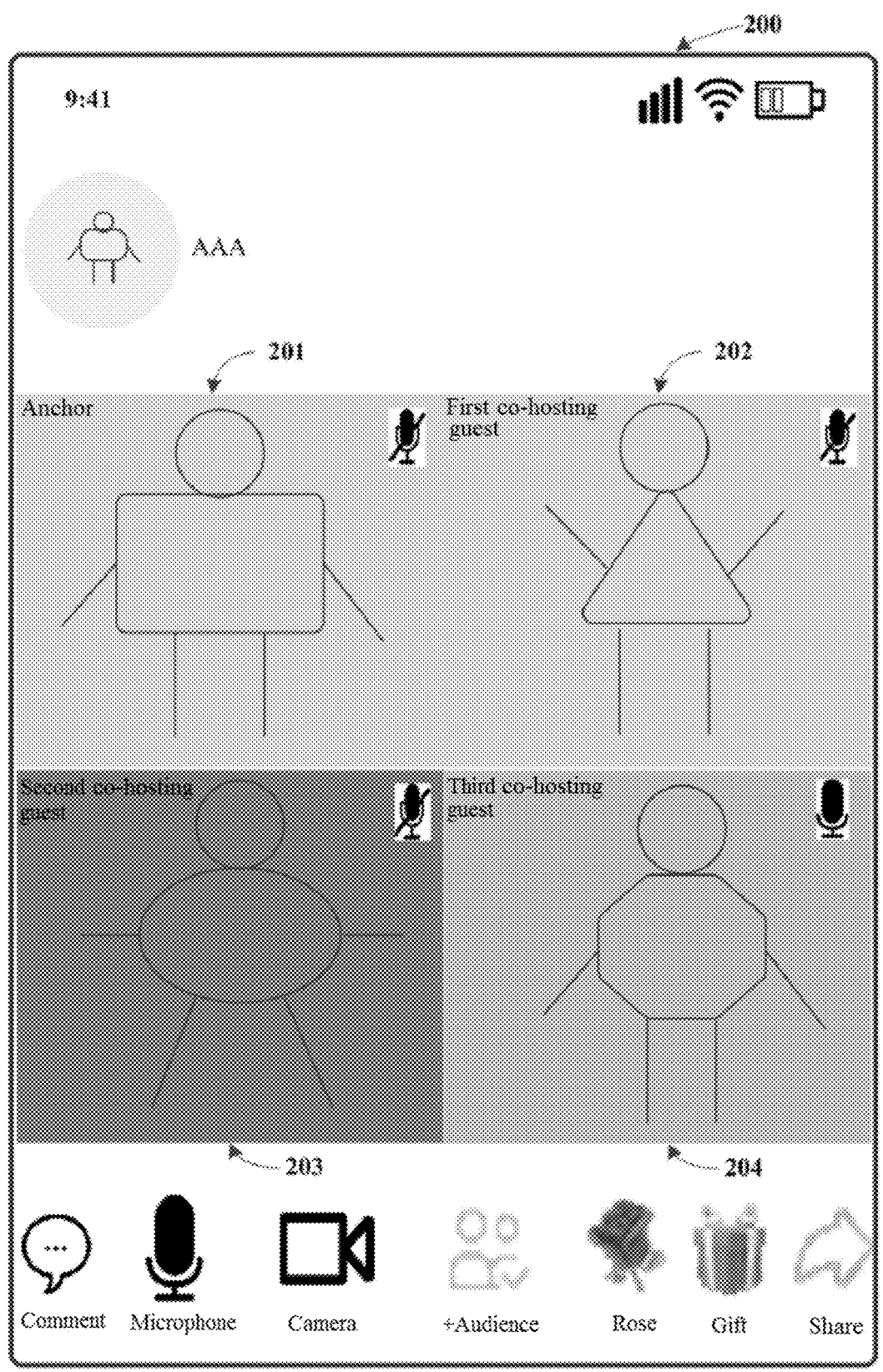
FIG. 2 is a schematic diagram of a live video page according to an embodiment of the present disclosure.

As an example, when the live video page is the page 200 shown in FIG. 2, the "at least one candidate user display interface" may include an interface 201, an interface 202, an interface 203 and an interface 204 shown in FIG. 2. The interface 201 is configured to display a co-hosting presentation state of an anchor in a live room, for example, a microphone in a disabling state and a camera in an enabling state. The interface 202 is configured to display a co-hosting presentation state of the first co-hosting guest in the live room, for example, a microphone in a disabling state and a camera in an enabling state. The interface 203 is configured to display a co-hosting presentation state of the second co-hosting guest in the live room, for example, a microphone in a disabling state and a camera in an enabling state. The interface 204 is configured to display a co-hosting presentation state of the third co-hosting guest in the live room, for example, a microphone in an enabling state and a camera in an enabling state. It should be noted that the page 200 shown in FIG. 2 refers to a live video page displayed on an electronic device used by the third co-hosting guest.

In addition, a display device of the live video page is not limited in the embodiments of the present disclosure. For example, when the interaction method according to the embodiment of the present disclosure is applied to an anchor end of a live streaming, the display device of the live video page is a client of the anchor in the live streaming, so that the anchor in the live room may see the live video page from the anchor end of the live streaming. For another example, when the interaction method according to the embodiment of the present disclosure is applied to a guest end corresponding to a co-hosting guest (for example, the third co-hosting guest shown in FIG. 2) in the live room, the display device of the live video page is a client of the guest, so that the co-hosting guest may see the live video page (for example, the page 200 shown in FIG. 2) from the guest end. For another example, when the interaction method according to the embodiment of the present disclosure is applied to an audience end corresponding to an audience in the live room, the display device of the live video page is a client of the audience, so that the audience may see the live video page from the audience end.

As can be seen from the relevant content of S1, for an electronic device used by any participant (for example, an anchor, a co-hosting guest or an audience) in a live room, if the live room is in a live streaming co-hosting scenario, the electronic device may not only be used to display a live video page (for example, a live streaming co-hosting page) corresponding to the live room, but also be used to display at least one candidate user display interface (for example, an anchor display page, co-hosting display pages of respective co-hosting guests, etc.) on the live video page. In this way, the participant may not only know a co-hosting presentation state of the anchor or each co-hosting guest from the electronic device, but also interact with (for example, send gifts to) the anchor or each co-hosting guest.

In S2, an interaction interface is displayed on the live video page in response to a trigger operation on a target user display interface in the at least one candidate user display interface, where the interaction interface includes at least one virtual gift.

The target user display interface refers to a selected candidate user display interface, for example, an interface selected from the at least one candidate user display interface by a viewer of the live video page. For convenience of understanding, description is made below in conjunction with an example.

As an example, the live video page is the page 200 shown in FIG. 2, and the "at least one candidate user display interface" includes the interface 201, the interface 202, the interface 203 and the interface 204 shown in FIG. 2. In this case, if the viewer of the live video page triggers a preset selection operation (e.g., a click operation) on the interface 202, the interface 202 may be determined as the target user display interface, such that the viewer may trigger some interaction operations (e.g., sending gifts) on the target user display interface.

The "trigger operation on a target user display interface" in S2 is not limited in the embodiments of the present disclosure. For example, it may be any kind of selection operation, such as, a click operation.

The interaction interface may be a gift panel, which is configured to provide some interaction operations (e.g., sending gifts, etc.) to the viewer of the live video page. Furthermore, the interaction interface is not limited in the embodiments of the present disclosure. For example, the interaction interface may include at least one virtual gift. The virtual gift may be send to a client corresponding to the target user display interface. For convenience of understanding, description is made below in conjunction with two examples.

In example 1, a viewer of the live video page is an anchor, that is, the interaction method according to the embodiment of the present disclosure is applied to an anchor end of a live streaming. In this case, if the target user display interface is an interface 309 shown in FIG. 3, the interaction interface may be a page 310 shown in FIG. 3. The virtual gifts deployed on the interaction interface may include Gift 1, Gift 2 and the like shown in FIG. 3, such that the anchor may select one or more of the gifts and send the selected gifts to a co-hosting guest corresponding to the interface 309. It should be noted that a page 300 shown in FIG. 3 refers to a live video page displayed on an anchor end of the live streaming.

In example 2, a viewer of the live video page is a live viewer (for example, a co-hosting guest or an audience), that is, the interaction method according to the embodiment of the present disclosure is applied to a guest end corresponding to the co-hosting guest or an audience end of the audience. In this case, if the target user display interface is an interface 405 shown in FIG. 4, the interaction interface may be a page 407 shown in FIG. 4. The virtual gifts deployed on the interaction interface may include Gift 1, Gift 2 and the like shown in FIG. 4, such that the live viewer may select one or more of the gifts and send the selected gifts to a co-hosting guest corresponding to the interface 405. It should be noted that a page 400 shown in FIG. 4 refers to a live video page displayed on the guest end corresponding to the co-hosting guest or the audience end of the audience.

Figure 3:
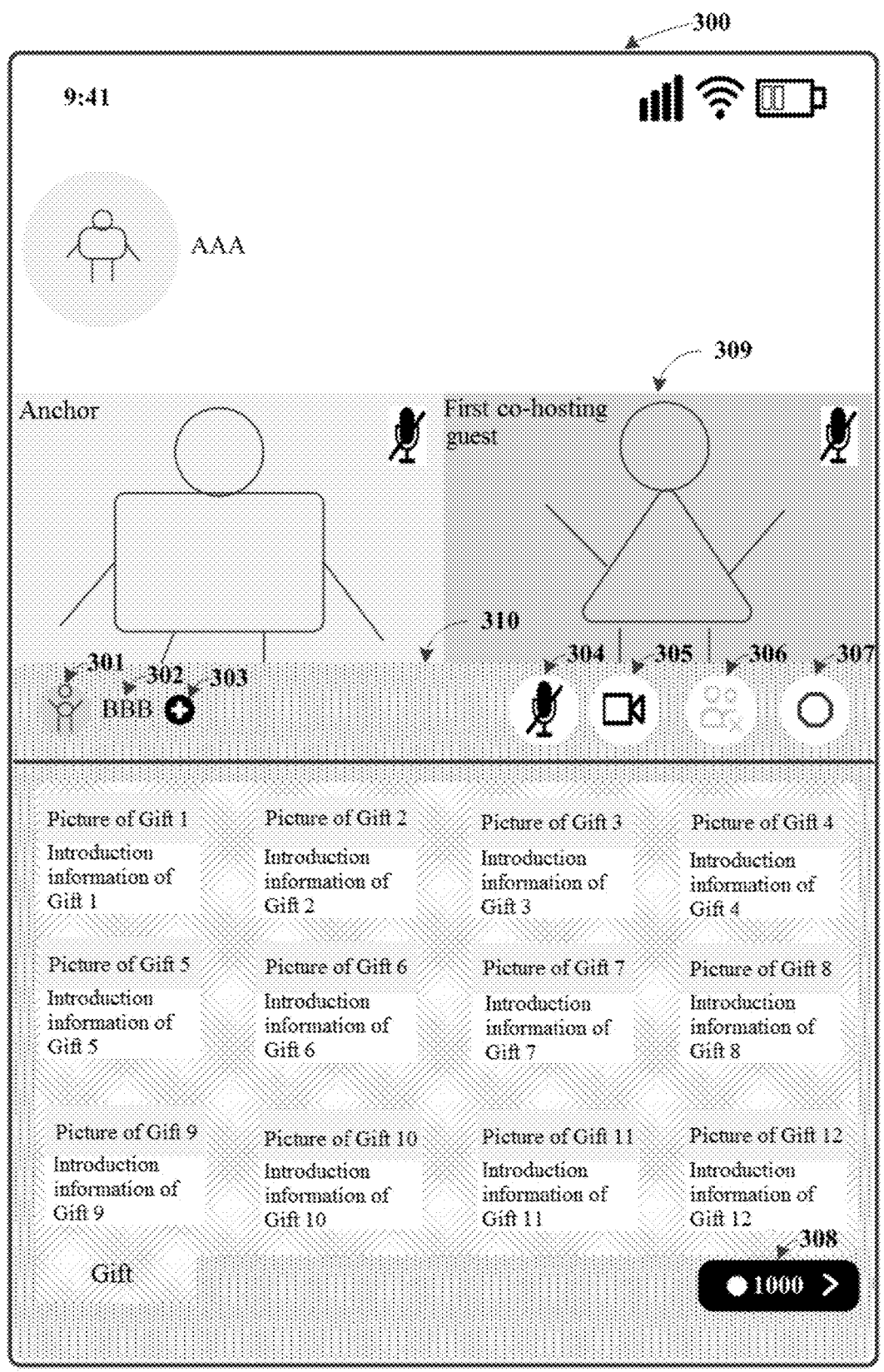
FIG. 3 is a schematic diagram of a live video page according to another embodiment of the present disclosure.
Figure 4:
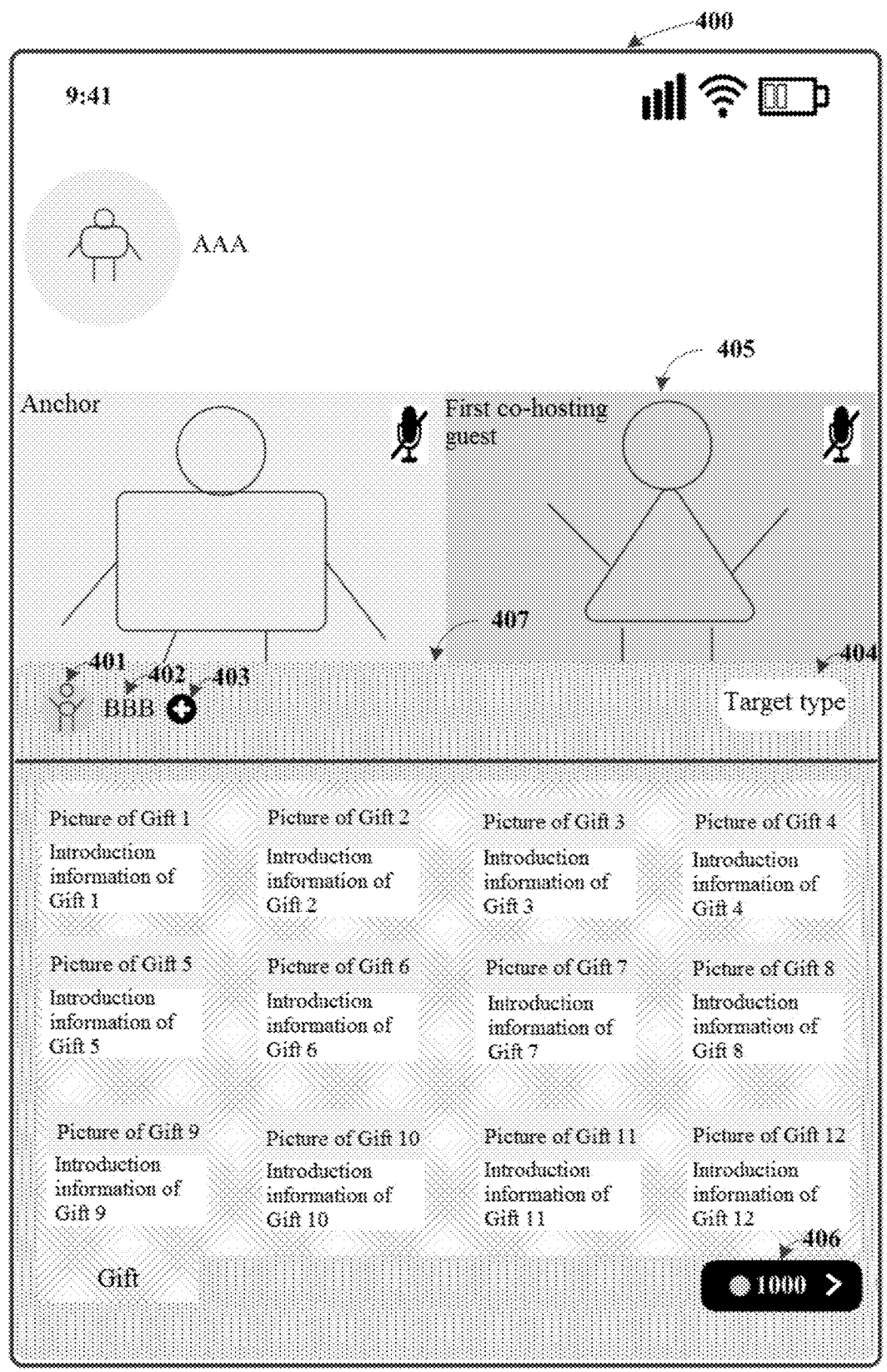
FIG. 4 is a schematic diagram of a live video page according to another embodiment of the present disclosure.

It should also be noted that a gift m shown in FIG. 3 or FIG. 4 is a usable virtual gift. A picture of the gift m is used to show what the gift m looks like. Introduction information of the gift m is used to describe relevant content of the gift m, for example, a name, a resource value to be consumed by using the gift m. m is a positive integer, m≤M, M is a positive integer, and M represents the number of virtual gifts. In addition, FIG. 3 or FIG. 4 only shows some gifts, and viewers of the live video page may view other gifts by sliding up and down.

In fact, for the live streaming co-hosting scenario, users with different live room role description information may select different interaction objects. For example, an anchor may select any co-hosting guest for interaction. For another example, the n-th co-hosting guest may select the anchor or any other co-hosting guest in the live room except the n-th co-hosting guest for interaction, where n is a positive integer, n≤N, N is a positive integer, and N represents the number of co-hosting guests in the live room. For another example, the k-th audience may select the anchor or any co-hosting guest for interaction, where k is a positive integer, k≤K, K is a positive integer, and K represents the number of audiences in the live room. The live room role description information is used to describe a user type to which a user in the live room belongs. The live room role description information may include for example, an anchor, a co-hosting guest or an audience. It should be noted that the "live room role description information" is not limited in the embodiments of the present disclosure. For example, the live room role description information of the anchor in the live room may include a character string "anchor".

In order to satisfy interaction object selection requirements of clients with different live room role description information, some possible implementations of S2 are further provided according to an embodiment of the present disclosure. For convenience of understanding, description is made below in conjunction with two implementations.

In a first possible implementation, the interaction method according to the embodiment of the present disclosure is applied to a first client (for example, an anchor end or a guest end), and the "at least one candidate user display interface" includes a candidate user display interface corresponding to the first client and a candidate user display interface corresponding to at least one second client. In this case, S2 may specifically include: displaying the interaction interface on the live video page, in response to the trigger operation on the target user display interface in the candidate user display interface corresponding to the at least one second client.

The first client refers to an intersection of an executive subject of the interaction method according to the embodiments of the present disclosure and a set of client corresponding to the at least one candidate user display interface. The set of client is used to record a client corresponding to each candidate user display interface. That is, the first client is the executive subject of the interaction method according to the embodiment of the present disclosure, and relevant information (for example, voice data or video data, etc.) of a holder of the first client is displayed on the live video page, so that any participant in the live room may see the relevant information of the holder in the live room.

In addition, the first client is not limited in the embodiments of the present disclosure. For example, the first client may be an anchor end of the live streaming or a guest end corresponding to the n-th co-hosting guest, where n is a positive integer, n≤N, N is a positive integer, and N represents the number of co-hosting guests in the live room.

The "candidate user display interface corresponding to the first client" is configured to display a co-hosting presentation state of the holder of the first client.

The second client is configured to represent an object which may interact with the first client, and the second client is different from the first client.

In addition, the "at least one second client" may include other clients in the set of client corresponding to the at least one candidate user display interface except the first client. For example, when the first client is the anchor end of the live streaming, the "at least one second client" may include a guest end corresponding to the first co-hosting guest to a guest end corresponding to the n-th co-hosting guest. For another example, when the first client is a guest end corresponding to the i-th co-hosting guest, the "at least one second client" may include the anchor end of the live streaming and other guest ends corresponding to N−1 co-hosting guests except the i-th co-hosting guest in N co-hosting guests, where i is a positive integer, and i∈{1, 2, . . . , N}.

In addition, a candidate user display interface corresponding to the j-th second client is configured to display a co-hosting presentation state of a holder of the j-th second client, where j is a positive integer, j≤J, and J represents the number of second clients.

Based on the relevant content of the first possible implementation, when an executive subject of the interaction method according to the embodiment of the present disclosure is the first client (for example, the anchor end of the live streaming or the guest end), a candidate user display interface corresponding to the first client is also displayed on a live video page, and a holder of the first client usually does not select his own candidate user display interface as an interaction object. Thus, in the case that the holder of the first client selects an interaction object, the candidate user display interface corresponding to the first client is usually not considered. Therefore, a range of the interface selectable by the holder of the first client may generally be all other interfaces in the "at least one candidate user display interface" except the candidate user display interface corresponding to the first client. Furthermore, the target user display interface selected on the first client may usually come from all other interfaces in the "at least one candidate user display interface" except the candidate user display interface corresponding to the first client. Therefore, interface selection requirements of the holder of the first client (for example, the anchor or the i-th co-hosting guest) can be satisfied, and a user experience can be improved.

In a second possible implementation, when the interaction method according to the embodiment of the present disclosure is applied to an audience end, S2 may specifically include: displaying an interaction interface on the live video page in response to a trigger operation on a target user display interface in the at least one candidate user display interface.

In an embodiment, the executive subject of the interaction method according to the embodiment of the present disclosure is an audience end corresponding to the k-th audience. Since the k-th audience is in a becoming-audience state in the live room, the k-th audience is irrelevant to all candidate user display interfaces displayed on the live video page. Thus, the k-th audience may select an interaction object from all candidate user display interfaces displayed on the live video page. Therefore, a range of the interface selectable by the k-th audience is the "at least one candidate user display interface". Furthermore, the target user display interface selected on the audience end corresponding to the k-th audience comes from the "at least one candidate user display interface". Therefore, interface selection requirements of the audience can be satisfied, and a user experience can be improved. The audience end corresponding to the k-th audience refers to an electronic device used by the k-th audience in a process of watching the live streaming. k is a positive integer, k≤K, K is a positive integer, and K represents the number of audiences in the live room.

As can be seen from the relevant content of S2, for an electronic device used by any participant (for example, an anchor, a co-hosting guest or an audience) in a live room, when a live video page (for example, a live streaming co-hosting page) is displayed on the electronic device and the live video page includes at least one candidate user display interface (for example, an anchor display page, co-hosting display pages of respective co-hosting guests), if the participant wants to interact with (e.g., send a gift to) a target presenter (e.g., an anchor or a co-hosting guest) in the live room, the participant may trigger a preset selection operation (e.g., a click operation, etc.) on a candidate user display interface (i.e., a target user display interface) corresponding to the target presenter on the electronic device. Thus, the electronic device may display an interaction interface on the live video page. Therefore, the participant may interact with the target presenter by means of one or more virtual gifts displayed on the interaction interface (for example, sending one or more virtual gifts to the target presenter, etc.).

In S3, a target gift in the at least one virtual gift is sent to a client corresponding to the target user display interface, in response to a trigger operation on the target gift.

The target gift refers to a selected virtual gift, for example, a gift selected from at least one virtual gift by the viewer of the live video page. For example, the target gift may be Gift 1 shown in FIG. 3.

The client corresponding to the target user display interface is configured to provide display content (e.g., voice data or video data) of the target user display interface to the executive subject of the interaction method according to the embodiment of the present disclosure. In an embodiment, the client corresponding to the target user display interface may represent an interaction object of the viewer of the live video page. Moreover, the "client corresponding to the target user display interface" is not limited in the present disclosure. For example, when the target user display interface is the interface 309 shown in FIG. 3, the client corresponding to the target user display interface refers to a guest end corresponding to the first co-hosting guest shown in FIG. 3.

It should be noted that, the implementation in which "a target gift is sent to a client corresponding to the target user display interface" in S3 is not limited in the embodiments of the present disclosure. For example, it may be implemented by any existing or future gift sending method.

As can be seen from the relevant content of S1 to S3, for the interaction method according to the embodiment of the present disclosure, if the interaction method is applied to an electronic device used by any participant (for example, an anchor, a co-hosting guest or an audience) in the live room, when a live video page (for example, a live streaming co-hosting page) is displayed on the electronic device and the live video page includes at least one candidate user display interface (for example, an anchor display page, co-hosting display pages of respective co-hosting guests), the electronic device may display an interaction interface on the live video page, and some usable virtual gifts are deployed on the interaction interface, after the electronic device receives a trigger operation on the target user display interface (for example, a co-hosting display page of a co-hosting guest) in the candidate user display interfaces. Then, after the electronic device receives the trigger operation on the target gift in the virtual gifts, the electronic device may send the target gift to a client (for example, an anchor end of a live streaming or a guest end) corresponding to the target user display interface. Thus, the client corresponding to the target user display interface is able to receive the gift sent by the participant through the live video page. A purpose of sending the gift to the anchor or any co-hosting guest in the live room by the participant can be realized, and an interaction operation of the participant sending the gift to the anchor or any co-hosting guest in the live room can be simplified. Thus, an interaction path can be shortened, interaction efficiency can be improved, so that a gift sending enthusiasm of the participant can be improved, and a user experience (especially a gift sending experience) of the participant can be improved.

In fact, for the live streaming co-hosting scenario, users in the live room may not only have gift sending requirements, but also have some management requirements (for example, the anchor controlling the co-hosting guest to become an audience, etc.).

Based on the above requirements, a possible implementation of the interaction interface is further provided according to an embodiment of the present disclosure. In this implementation, the interaction interface may include at least one virtual gift, and at least one management control. Therefore, for the viewer of the live video page, the purpose of sending the gift to the client corresponding to the target user display interface can be achieved by means of the virtual gifts on the interaction interface. In addition, the purpose of state management for the client corresponding to the target user display interface can be achieved by means of the management controls on the interaction interface. The state management may include for example, the anchor adjusting a co-hosting presentation state of a co-hosting guest, and the anchor controlling a co-hosting guest to become an audience.

Based on this, in a possible implementation, the interaction interface further includes at least one management control. In this case, the interaction method according to the embodiment of the present disclosure may include not only S1 to S3, but also S4 below. An execution time of S4 is later than an execution time of S2, which will not be limited in the embodiments of the present disclosure.

In S4, state information of the client corresponding to the target user display interface is adjusted, in response to a trigger operation on a to-be-used control in the at least one management control.

The to-be-used control refers to a selected management control. Furthermore, the "trigger operation on a to-be-used control" in S4 is not limited in the embodiments of the present disclosure. For example, it may be a click operation.

The "state information of the client corresponding to the target user display interface" is used to describe a state of the client corresponding to the target user display interface. Furthermore, the "state information of the client corresponding to the target user display interface" is not limited in the embodiments of the present disclosure. For example, it may include at least one of a co-hosting presentation state corresponding to the target user display interface and user description information corresponding to the target user display interface.

The "co-hosting presentation state corresponding to the target user display interface" refers to an information display state (for example, an on/off state of a voice, an on/off state of a video) presented by the client corresponding to the target user display interface on the live video page.

It should be noted that the co-hosting presentation state includes, but is not limited to, a co-hosting voice state and a co-hosting display state. The co-hosting voice state includes a voice state of a co-hosting guest or a display state of a voice control in the co-hosting process. The voice state of a co-hosting guest may be the on/off state of a voice. The display state of the voice control may be an opening style and a closing style corresponding to the voice control. The co-hosting display state includes a video state of a co-hosting guest or a display state of a video control in the co-hosting process. The video state of the co-hosting guest may be a display state of a video picture, a display effect of the video picture, and display content of the video picture. The display state of the video control may be an opening style and a closing style corresponding to the video control.

The "user description information of the target user display interface" is used to describe a type of the client corresponding to the target user display interface.

In addition, in order to better understand S4, three scenarios are explained below.

In scenario 1, for an anchor in a live room, the anchor may not only send a gift to a co-hosting guest, but also perform the following operations on the co-hosting guest. The operation includes: adjusting a camera operation state of the co-hosting guest, controlling a microphone operation state of the co-hosting guest, setting a co-hosting state of the co-hosting guest in a becoming-audience state, and adjusting a type of the co-hosting guest.

Based on the interaction requirements of the anchor, a possible implementation of the "at least one management control" is further provided according to an embodiment of the present disclosure. In this implementation, when the interaction method according to the embodiment of the present disclosure is applied to an anchor end of a live streaming, the "at least one management control" may include at least one of at least one co-hosting presentation state adjustment control (for example, a voice control 304 and a video control 305 shown in FIG. 3), a becoming-audience control (for example, a control 306 shown in FIG. 3) and an operation selection control (for example, a control 307 shown in FIG. 3).

The "at least one co-hosting presentation state adjustment control" is used to adjust a co-hosting presentation state (for example, a voice state and a video state) corresponding to the target user display interface. Furthermore, the "at least one co-hosting presentation state adjustment control" is not limited in the embodiments of the present disclosure. For example, it may include at least one of a video control and a voice control. The video control is used to control a co-hosting display state of the client corresponding to the target user display interface on the live video page. The voice control is used to control a co-hosting voice state of the client corresponding to the target user display interface on the live video page.

The becoming-audience control is used to disconnect a co-hosting relationship between the anchor end of the live streaming and the client corresponding to the target user display interface, that is, to control the client corresponding to the target user display interface to become an audience. Furthermore, the becoming-audience control is not limited in the embodiments of the present disclosure. For example, it may specifically be the control 306 shown in FIG. 3.

The operation selection control is used to manage a selection state of at least one candidate operation option for the client corresponding to the target user display interface. The candidate operation option is used to indicate an operation that may be selected and used for a co-hosting guest at the anchor end of the live streaming, and the candidate operation option may be used to adjust user description information of the co-hosting guest.

In addition, the "at least one candidate operation option" is not limited in the embodiments of the present disclosure. For example, it may at least include at least one type of adjustment option.

Moreover, the implementation of the operation selection control is not limited in the embodiments of the present disclosure. For example, it may be implemented by using the control 307 shown in FIG. 3.

Based on the relevant content of one possible implementation of the "at least one management control", in the case that the "at least one management control" includes at least one of at least one co-hosting presentation state adjustment control, a becoming-audience control and an operation selection control, some possible implementations of S4 are further provided according to an embodiment of the present disclosure, which are respectively introduced below.

In a possible implementation, when the "at least one management control" at least includes at least one co-hosting presentation state adjustment control, S4 may include the following step 11. An execution time of step 11 is later than an execution time of S2, which will not be limited in the embodiments of the present disclosure.

In step 11, a co-hosting presentation state corresponding to the target user display interface is adjusted on the live video page, in response to a trigger operation on a target control in the at least one co-hosting presentation state adjustment control.

The target control refers to a selected co-hosting presentation state adjustment control, for example, a control selected by the viewer of the live video page from the at least one co-hosting presentation state adjustment control. For example, the interaction interface is the page 310 shown in FIG. 3, and the "at least one co-hosting presentation state adjustment control" includes a voice control 304 and a video control 305. If the viewer clicks the voice control 304, the target control is the voice control 304. If the viewer clicks the video control 305, the target control is the video control 305.

In addition, the "trigger operation on a target control" is not limited in the embodiments of the present disclosure. For example, it may specifically be a click operation.

In fact, different co-hosting presentation state adjustment controls may have different co-hosting presentation state adjustment functions. Based on this, a possible implementation of step 11 is further provided according to an embodiment of the present disclosure, which may specifically include: adjusting the co-hosting presentation state corresponding to the target user display interface on the live streaming co-hosting display page, based on a co-hosting presentation state adjustment rule of the target control in response to the trigger operation on the target control in the at least one co-hosting presentation state adjustment control.

The co-hosting presentation state adjustment rule of the target control is used to describe how to adjust the co-hosting presentation state corresponding to the target user display interface when the target control is triggered. For convenience of understanding, description is made below in conjunction with two examples.

In an example 1, if the target control is used to control a co-hosting voice state of the client corresponding to the target user display interface on the live video page (that is, the target control is a voice control), the co-hosting presentation state adjustment rule of the target control is as follows. If a current display state of the target control is an on state, the current display state of the target control may be directly and automatically switched to an off state when a trigger operation on the target control by the viewer of the live video page is received, so as to suspend a voice playing process for the client corresponding to the target user display interface. In this case, no one else in the live room may hear a real-time voice of the client corresponding to the target user display interface. However, if a current display state of the target control is an off state, the current display state of the target control may be automatically switched to an on state when a trigger operation on the target control by the viewer of the live video page is received, so as to start a voice playing process for the client corresponding to the target user display interface. In this case, other people in the live room may hear a real-time voice of the client corresponding to the target user display interface.

In some application scenarios (for example, a live streaming teaching scenario), for the voice control displayed on the interaction page, working principle of the voice control may specifically include: adjusting a voice state of the client corresponding to the target user display interface from a first voice state to a second voice state on the live video page, in response to a trigger operation on the voice control by the viewer of the live video page. The second voice state is an opposite state of the first voice state. For example, if the first voice state is a microphone enabling state, the second voice state is a microphone disabling state. If the first voice state is a microphone disabling state, the second voice state is a microphone enabling state.

It should be noted that, the microphone enabling state refers to playing a real-time audio of the client corresponding to the target user display interface to other people (for example, an audience end and other guest ends) in the live room. The microphone disabling state refers to not playing a real-time audio of the client corresponding to the target user display interface to other people in the live room.

Figure 5:
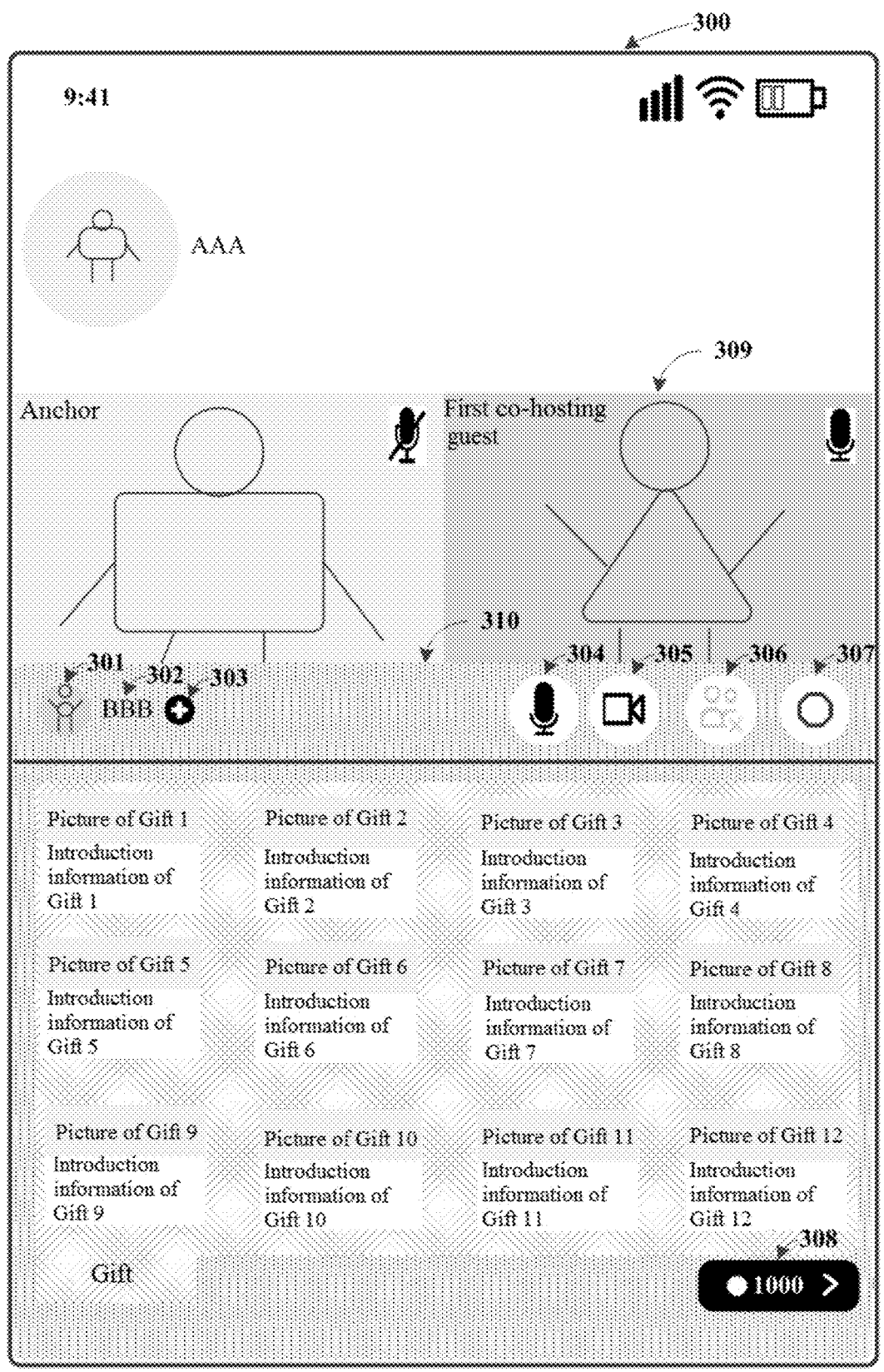
FIG. 5 is a schematic diagram of a live video page according to another embodiment of the present disclosure.

In addition, a display mode of the microphone enabling state is not limited in the embodiments of the present disclosure. For example, as shown in FIG. 5, the microphone enabling state may be displayed by using a microphone enabling icon shown in an operation area of the interaction page (for example, a microphone-on icon of a voice control 304 shown in FIG. 5), and a microphone icon shown in the target user display interface (for example, an interface 309 shown in FIG. 5). Thus, everyone in the live room may know that the client corresponding to the target user display interface is in a microphone-on state. Similarly, a display mode of the microphone disabling state is not limited in the embodiments of the present disclosure. For example, as shown in FIG. 3, the microphone disabling state may be displayed by using a microphone disabling icon shown in an operation area of the interaction page (for example, a microphone-off icon of a voice control 304 shown in FIG. 3), and a microphone icon shown in the target user display interface (for example, an interface 309 shown in FIG. 3). Thus, everyone in the live room may know that the client corresponding to the target user display interface is in a microphone-off state.

In an example 2, if the target control is used to control a video display state of the client corresponding to the target user display interface on the live video page (that is, the target control is a video control), the co-hosting presentation state adjustment rule of the target control is as follows. If a current display state of the target control is a camera enabling state, the current display state of the target control may be directly and automatically switched to a camera disabling state when a trigger operation on the target control by the viewer of the live video page is received, so as to suspend a video display process for the client corresponding to the target user display interface. In this way, no one else in the live room may see a real-time picture of the client corresponding to the target user display interface. If a current display state of the target control is a camera disabling state, the current display state of the target control may be automatically switched to a camera enabling state when the trigger operation on the target control by the viewer of the live video page is received, so as to start a video display process for the client corresponding to the target user display interface. In this way, other people in the live room may see a real-time picture of the client corresponding to the target user display interface.

It should be noted that, the camera enabling state indicates that a real-time picture of the client corresponding to the target user display interface is displayed on clients of other people except the client corresponding to the target user display interface in the live room. The camera disabling state indicates that a real-time picture of the client corresponding to the target user display interface is not displayed to other people.

In some application scenarios (for example, a live streaming teaching scenario), for the video control displayed on the interaction page, working principle of the video control may include: adjusting a video display state of the client corresponding to the target user display interface from a first use state to a second use state on the live video page, in response to a trigger operation on the video control by the viewer of the live video page. The second use state is an opposite state of the first use state. For example, if the first use state is a camera enabling state, the second use state is a camera disabling state. If the first use state is a camera disabling state, the second use state is a camera enabling state.

Figure 6:
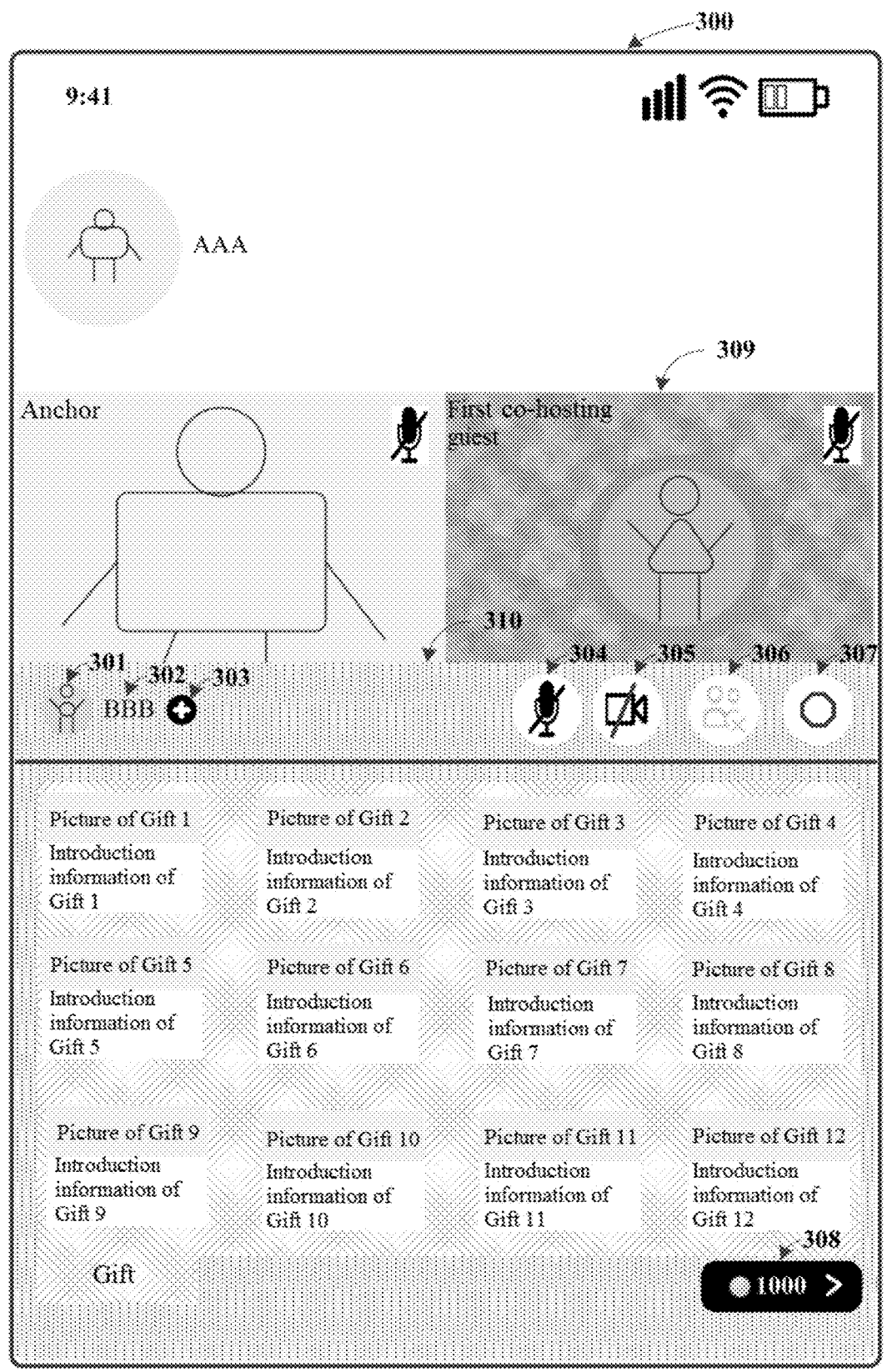
FIG. 6 is a schematic diagram of a live video page according to another embodiment of the present disclosure.

In addition, a display mode of the camera enabling state is not limited in the embodiments of the present disclosure. For example, as shown in FIG. 3, the camera enabling state may be displayed by two ways: a camera enabling icon shown in an operation area of the interaction page (for example, a camera-on icon of a video control 305 shown in FIG. 3), and image information presented in the target user display interface (for example, an interface 309 shown in FIG. 3). Thus, everyone in the live room may know that the client corresponding to the target user display interface is in the camera-on state. Similarly, a display mode of the camera disabling state is not limited in the embodiments of the present disclosure. For example, as shown in FIG. 6, the camera disabling state may be displayed by two ways: a camera disabling icon shown in an operation area of the interaction page (for example, a camera-off icon of a video control 305 shown in FIG. 6), and image information (for example, only displaying a user avatar corresponding to the target user display interface) presented in the target user display interface (for example, an interface 309 shown in FIG. 6). Thus, everyone in the live room may know that the client corresponding to the target user display interface is in the camera-off state.

In fact, for a co-hosting guest, the co-hosting guest sometimes doesn't want to turn on a voice or video subjectively. Therefore, in order to better satisfy co-hosting requirements of the co-hosting guest, another possible implementation of step 11 is further provided according to an embodiment of the present disclosure, which may specifically include steps 111 to 113.

In step 111, display state description information of the target control is acquired in response to the trigger operation on the target control in the at least one co-hosting presentation state adjustment control.

The display state description information is used to describe a display state of the target control presented on the interaction page at a time of the trigger operation on the target control. For example, the target control is a voice control 304 shown in FIG. 3. In this case, if the viewer of the live video page triggers a click operation on the voice control 304, the display state description information of the target control may specifically at least include: displaying the voice control 304 with a microphone-off icon when the voice control 304 is clicked. The microphone-off icon may indicate that the client corresponding to the target user display interface is in a microphone disabling state.

In addition, an acquisition process of the display state description information is not limited in the embodiments of the present disclosure. For example, it may be implemented by any existing or future acquisition method of the display state description information for the control.

Based on the relevant content of step 111, for an anchor end of a live streaming, when an interaction page is displayed on a live video page of the anchor end of the live streaming, and at least one co-hosting presentation state adjustment control is deployed on the interaction page. After the anchor end of the live streaming receives a trigger operation (e.g., a click operation) on a target control in the co-hosting presentation state adjustment controls, display state description information of the target control may be acquired. Thus, feedback may be made based on the display state description information.

In step 112, a co-hosting presentation state corresponding to the target user display interface is adjusted from a first co-hosting state to a second co-hosting state on the live video page, if the display state description information of the target control indicates that the target control is in a first display state.

The first display state may be set in advance based on a function of the target control. For example, if the target control is a video control, the first display state may be a camera enabling icon, such that the first display state may indicate that the client corresponding to the target user display interface is in a camera enabling state. For another example, if the target control is a voice control, the first display state may be a microphone enabling icon, so that the first display state may indicate that the client corresponding to the target user display interface is in a microphone enabling state.

The first co-hosting state refers to a co-hosting state characterized by the first display state. For example, it may include a co-hosting state characterized by the target control at a time of the trigger operation on the target control. For example, if the target control is a video control, in the case that the first display state indicates that the client corresponding to the target user display interface is in the camera enabling state, the first co-hosting state may be a camera enabling state. For another example, if the target control is a voice control, in the case that the first display state is used to indicate that the client corresponding to the target user display interface is in the microphone enabling state, the first co-hosting state includes the microphone enabling state.

The second co-hosting state refers to an opposite state of the first co-hosting state. For example, if the first co-hosting state includes a camera enabling state, the second co-hosting state may include a camera disabling state. As another example, if the first co-hosting state includes a microphone enabling state, the second co-hosting state includes a microphone disabling state.

Based on the relevant content of step 112, for an anchor end of a live streaming, an interaction page is displayed on a live video page of the anchor end of the live streaming, and at least one co-hosting presentation state adjustment control is deployed on the interaction page. In this case, after the anchor end of the live streaming receives a trigger operation (e.g., a click operation) on a target control in the co-hosting presentation state adjustment control, if it is determined that the target control is in a first display state (e.g., a camera enabling icon or a microphone enabling icon), it may be determined that a process for adjusting a co-hosting state based on the target control will not cause unnecessary trouble to a client corresponding to a target user display interface. Therefore, a co-hosting presentation state corresponding to the target user display interface may be directly adjusted from a first co-hosting state to a second co-hosting state (for example, from a camera enabling state to a camera disabling state, or from a microphone enabling state to a microphone disabling state) on the live video page.

In step 113, a co-hosting presentation state adjustment request is sent to the client corresponding to the target user display interface if the display state description information of the target control indicates that the target control is in a second display state. Therefore, the client corresponding to the target user display interface may feed back the co-hosting presentation state adjustment request based on a personal requirement.

The second display state refers to an opposite state of the first display state. For example, if the target control is a video control, the second display state may be a camera disabling icon, such that the second display state may indicate that the client corresponding to the target user display interface is in a camera disabling state. For another example, if the target control is a voice control, the second display state may be a microphone disabling icon, such that the second display state may indicate that the client corresponding to the target user display interface is in a microphone disabling state.

The "co-hosting presentation state adjustment request" is used to request that the co-hosting presentation state corresponding to the target user display interface be adjusted from a third co-hosting state to a fourth co-hosting state.

The third co-hosting state refers to a co-hosting state characterized by the second display state. For example, it may include a co-hosting state characterized by the target control at a time of the trigger operation on the target control. For example, if the target control is a video control, in the case that the second display state indicates that the client corresponding to the target user display interface is in a camera disabling state, the third co-hosting state may be a camera disabling state. For another example, if the target control is a voice control, in the case that the second display state indicate that the client corresponding to the target user display interface is in a microphone disabling state, the third co-hosting state includes a microphone disabling state.

The fourth co-hosting state refers to an opposite state of the third co-hosting state. For example, if the third co-hosting state includes a camera disabling state, the fourth co-hosting state may include a camera enabling state. As another example, if the third co-hosting state includes a microphone disabling state, the fourth co-hosting state includes a microphone enabling state.

In addition, an expression mode of the "co-hosting presentation state adjustment request" is not limited in the embodiments of the present disclosure. For example, it may be expressed by a character string or a picture.

Moreover, a display mode of the "co-hosting presentation state adjustment request" on the client corresponding to the target user display interface is not limited in the embodiments of the present disclosure. For example, it may be displayed by a pop-up window, a comment, etc.

Furthermore, a feedback mode of the client corresponding to the target user display interface for the "co-hosting presentation state adjustment request" is not limited in the embodiments of the present disclosure. For example, if the client corresponding to the target user display interface agrees to adjust the co-hosting presentation state from the third co-hosting state to the fourth co-hosting state, the co-hosting presentation state of the client corresponding to the target user display interface may be adjusted from the third co-hosting state to the fourth co-hosting state. If the client corresponding to the target user display interface does not agree to adjust the co-hosting presentation state from the third co-hosting state to the fourth co-hosting state, feedback information indicating a semantic of "refusing to adjust" may be fed back to a sender (i.e., the anchor end of the live streaming) of the "co-hosting presentation state adjustment request".

It should be noted that, the implementation for adjusting "the co-hosting presentation state of the client corresponding to the target user display interface from the third co-hosting state to the fourth co-hosting state" in the previous paragraph is not limited in the embodiments of the present disclosure. For convenience of understanding, description is made below in conjunction with two examples.

In an example 1, for the client corresponding to the target user display interface, after the client receives the "co-hosting presentation state adjustment request", a holder of the client may manually adjust the co-hosting presentation state of the client from the third co-hosting state to the fourth co-hosting state.

In an example 2, for the client corresponding to the target user display interface, after the client receives the "co-hosting presentation state adjustment request", a holder of the client may input feedback information indicating a semantic of "agreeing to adjust" for the "co-hosting presentation state adjustment request" on the client. Therefore, the client may send the feedback information to the sender (i.e., the anchor end of the live streaming) of the "co-hosting presentation state adjustment request". In addition, the client may automatically adjust the co-hosting presentation state of the client from the third co-hosting state to the fourth co-hosting state based on the feedback information.

Based on the relevant content of step 11, for an anchor end of a live streaming, an interaction page is displayed on a live video page of the anchor end of the live streaming, and at least one co-hosting presentation state adjustment control is deployed on the interaction page. In this case, a holder of the anchor end of the live streaming may adjust a co-hosting presentation state (e.g., a voice state and a video state) corresponding to the target user display interface by means of the co-hosting presentation state adjustment controls. Therefore, co-hosting management requirements of an anchor in a live room for a co-hosting guest is satisfied, and a user experience of the anchor is improved.

In a possible implementation, in the case that the "at least one management control" at least includes a becoming-audience control, S4 may include the following steps 12 to 13. An execution time of step 12 is later than an execution time of S2, which will not be limited in the embodiments of the present disclosure.

In step 12, becoming-audience confirmation information is displayed, in response to a trigger operation on the becoming-audience control.

The becoming-audience confirmation information is used to confirm whether to disconnect a co-hosting relationship with the client corresponding to the target user display interface, that is, whether to control the client corresponding to the target user display interface to become an audience.

In addition, an expression mode of the becoming-audience confirmation information is not limited in the embodiments of the present disclosure. For example, it may be expressed by a character string or a picture.

Moreover, a display mode of the becoming-audience confirmation information is not limited in the embodiments of the present disclosure. For example, it may be displayed by a pop-up window.

Furthermore, the "trigger operation on the becoming-audience control" in step 12 is not limited in the embodiments of the present disclosure. For example, it may be a click operation.

Based on the relevant content of step 12, for an anchor end of a live streaming, an interaction page is displayed on a live video page of the anchor end of the live streaming, and a becoming-audience control (for example, a control 306 shown in FIG. 3) is deployed on the interaction page. In this case, after receiving a trigger operation (for example, a click operation) on the becoming-audience control, the anchor end of the live streaming may display becoming-audience confirmation information on the live video page. Thus, a viewer may confirm whether to disconnect a co-hosting relationship with the client corresponding to the target user display interface (that is, whether to control the client corresponding to the target user display interface to become an audience) based on the becoming-audience confirmation information. Therefore, an adverse effect caused by a misoperation of the viewer can be effectively avoided, and a user experience can be improved.

In step 13, display of the target user display interface is removed from a video play page, in response to a preset operation triggered for the becoming-audience confirmation information.

The preset operation refers to an operation used to represent an intention of agreeing to disconnect the co-hosting relationship with the client corresponding to the target user display interface, that is, agreeing to control the client corresponding to the target user display interface to become an audience. Moreover, the preset operation is not limited in the embodiments of the present disclosure. For example, when the becoming-audience confirmation information is displayed by a pop-up window, if a confirmation button and a rejection button are arranged on the pop-up window, the preset operation may be a click operation on the confirmation button.

Based on the relevant content of step 13, for an anchor end of a live streaming, becoming-audience confirmation information is displayed on a live video page of the anchor end of the live streaming. In this case, after receiving a preset operation (for example, a click operation on a confirmation button) triggered for the becoming-audience confirmation information, the anchor end of the live streaming may determine that a holder (that is, an anchor) of the anchor end of the live streaming really wants to control the client corresponding to the target user display interface to become an audience. Therefore, the anchor end of the live streaming may directly remove display of the target user display interface from a video play page, so as to become the client corresponding to the target user display interface to be an audience. Thus, the target user display interface is no longer displayed on the live video page watched by all users in a live room. Therefore, becoming-audience management requirements of the anchor in the live room for a co-hosting guest is satisfied.

Based on the relevant content of steps 12 to 13, for an anchor end of a live streaming, an interaction page is displayed on a live video page of the anchor end of the live streaming, and a becoming-audience control (for example, a control 306 shown in FIG. 3) is deployed on the interaction page. In this case, a holder of the anchor end of the live streaming may control whether to disconnect a co-hosting relationship with the client corresponding to the target user display interface (that is, whether to control the co-hosting relationship with the client corresponding to the target user display interface to be disconnected) by means of the becoming-audience control. Therefore, becoming-audience management requirements of the anchor in the live room for a co-hosting guest is satisfied, and the user experience of the anchor can be improved.

In a possible implementation, in a case that the "at least one management control" at least includes an operation selection control, S4 may include the following steps 14 to 15. An execution time of step 14 is later than an execution time of S2, which will not be limited in the embodiments of the present disclosure.

In step 14, at least one candidate operation option is displayed in response to a trigger operation on the operation selection control.

In an embodiment of the present disclosure, for an anchor end of a live streaming, an interaction page is displayed on a live video page of the anchor end of the live streaming, and an operation selection control (for example, a control 307 shown in FIG. 3) is deployed on the interaction page. In this case, after receiving a trigger operation (for example, a click operation) on the operation selection control, the anchor end of the live streaming may display at least one candidate operation option on the live video page, so that a holder of the anchor end of the live streaming may select an option to be used from the candidate operation options.

It should be noted that a display mode of the "at least one candidate operation option" is not limited in the embodiments of the present disclosure. For example, it may be displayed in a form of a drop-down list. As another example, it may also be displayed by a pop-up window.

It should also be noted that the "trigger operation on the operation selection control" in step 14 is not limited in the embodiments of the present disclosure. For example, it may be a click operation.

In step 15, user description information of the target user display interface is adjusted in response to a selection operation on a target option in the at least one candidate operation option.

The target option refers to a selected candidate operation option. For example, the "at least one candidate operation option" includes a first type adjustment option, a second type adjustment option and the like. When a holder of an anchor end of a live streaming selects the second type adjustment option from the candidate operation options, the second type adjustment option may be determined as the target option.

In addition, the "selection operation on a target option" is not limited in the embodiments of the present disclosure. For example, it may be a click operation triggered for the target option.

The "user description information of the target user display interface" is used to indicate a type of the client corresponding to the target user display interface. Furthermore, a process for adjusting the "user description information of the target user display interface" is not limited in the embodiments of the present disclosure. For example, it may specifically include steps 21 to 24.

In step 21, state representation content of the target option is determined in response to the selection operation on the target option in the at least one candidate operation option.

The state representation content of the target option is used to describe an attribute value presented by the client corresponding to the target user display interface under the target option (for example, whether it belongs to a user type represented by the target option).

In step 22, it is determined whether the state representation content of the target option exists in the user description information of the target user display interface. If the state representation content of the target option exists in the user description information of the target user display interface, step 23 is performed. Otherwise, step 24 is performed.

In an embodiment of the present disclosure, after the state representation content of the target option is acquired, it may be determined whether the state representation content exists in the user description information of the target user display interface. If the state representation content exists in the user description information of the target user display interface, it means that the client corresponding to the target user display interface has been in a state represented by the state representation content at least once, and thus it is only required to increase the number of occurrences of the state representation content. Otherwise, it means that the client corresponding to the target user display interface does not enter a state represented by the state representation content, and thus the client corresponding to the target user display interface may be adjusted to the state represented by the state representation content.

In step 23, the number of occurrences of the state representation content of the target option is updated in the user description information of the target user display interface.

The number of occurrences is used to indicate the number of occurrences of the "state representation content of the target option" for the client corresponding to the target user display interface. For example, when the target option is the first type adjustment option, the number of occurrences of the state representation content of the target option may indicate the number of adjustment processing of the first type triggered by the anchor in the live room for the client corresponding to the target user display interface.

In step 24, the state representation content of the target option is added to the user description information of the target user display interface, and the number of occurrences of the state representation content of the target option is initialized in the user description information of the target user display interface (for example, an initial value of the number of occurrences is 1).

Based on the relevant content of steps 21 to 24, for an anchor end of a live streaming, at least one candidate operation option is displayed on a live video page of the anchor end of the live streaming. After receiving a selection operation on a target option in the candidate operation options, the anchor end of the live streaming may generate state representation content of the target option. The state representation content may indicate a state presented by a client corresponding to a target user display interface under the target option. Then, state information of the client corresponding to the target user display interface may be updated by using the state representation content. The updated state information may indicate that a holder of the anchor end of the live streaming has selected the target option for the client corresponding to the target user display interface. Therefore, operation and management requirements of the anchor for some user types of co-hosting guests can be satisfied.

Based on the relevant content of steps 14 to 15, for an anchor end of a live streaming, an interaction page is displayed on a live video page of the anchor end of the live streaming, and an operation selection control (for example, a control 307 shown in FIG. 3) is deployed on the interaction page. In this case, a holder of the anchor end of the live streaming may manage an attribute value of the client corresponding to the target user display interface in some user types by using the operation selection control. Therefore, operation and management requirements of an anchor for some user types of co-hosting guests can be satisfied, and a user experience of the anchor can be improved.

Based on the relevant content of scenario 1, for an anchor end of a live streaming, an interaction page is displayed on a live video page of the anchor end of the live streaming. The interaction page may include at least one virtual gift (for example, Gift 1, Gift 2 and the like shown in FIG. 3), as well as at least one co-hosting presentation state adjustment control (for example, a voice control 304 and a video control 305 shown in FIG. 3), a becoming-audience control (for example, a control 306 shown in FIG. 3) and an operation selection control (for example, a control 307 shown in FIG. 3). Thus, a holder (i.e., an anchor) of the anchor end of the live streaming may send the gift to a co-hosting guest corresponding to the target user display interface. Furthermore, the holder may perform some state management for the co-hosting guest corresponding to the target user display interface by means of the interaction interface. The state management may include for example, adjusting an on/off state of a video of the co-hosting guest, controlling an on/off state of a voice of the co-hosting guest, changing a co-hosting state of the co-hosting guest, and adjusting an attribute value of the co-hosting guest in some user types. Therefore, interaction requirements of the anchor in the live room for the co-hosting guest can be better satisfied, and a user experience of the anchor can be improved.

In scenario 2, for a co-hosting guest in a live room, the co-hosting guest may send a gift to the anchor in the live room or other co-hosting guests except the co-hosting guest. In addition, the co-hosting guest may perform the following operations on the anchor in the live room or other co-hosting guests except the co-hosting guest: adjusting a type of other co-hosting guests except the co-hosting guest or adjust a type of the anchor in the live room.

Based on the above interaction requirements of the co-hosting guest, another possible implementation of the "at least one management control" is further provided according to an embodiment of the present disclosure. In this implementation, in a case that the interaction method according to the embodiment of the present disclosure is applied to a guest end, the "at least one management control" may include a target type setting control (for example, a control 404 shown in FIG. 4). The target type setting control is used to perform target type setting processing on the client corresponding to the target user display interface.

Based on this, when the "at least one management control" includes a target type setting control, S4 may include the following steps 16 to 17. An execution time of step 16 is later than an execution time of S2, which will not be limited in the embodiments of the present disclosure.

In step 16, at least one candidate description content is displayed in response to a trigger operation on the target type setting control.

The at least one candidate description content is used to indicate a reason that may be selected when a target type setting is performed on the client corresponding to the target user display interface. Furthermore, the "at least one candidate description content" is not limited in the embodiments of the present disclosure. For example, it may at least include a first reason, a second reason and the like.

In addition, a display mode of the "at least one candidate description content" is not limited in the embodiments of the present disclosure. For example, it may be displayed by a pop-up window or a drop-down page.

Furthermore, the "trigger operation on the target type setting control" in step 16 is not limited in the embodiments of the present disclosure. For example, it may be a click operation.

Based on the relevant content of step 16, for a guest end corresponding to a co-hosting guest, an interaction page is displayed on a live video page of the guest end, and a target type setting control is deployed on the interaction page. In this case, after receiving a trigger operation (e.g., a click operation) on the target type setting control, the guest end may display at least one candidate description content on the live video page, so that a holder of the guest end may select a setting reason to be used from the candidate description content.

In step 17, target type setting information of the target user display interface is generated and sent in response to a selection operation on target content in the at least one candidate description content.

The target content refers to the selected candidate description content.

The target type setting information of the target user display interface is used to describe relevant information involved in performing the target type setting on the client corresponding to the target user display interface. Furthermore, a process for determining the target type setting information of the target user display interface is not limited in the embodiments of the present disclosure. For example, it may specifically include: directly determining the target content as the target type setting information of the target user display interface.

In addition, a receiving end of the target type setting information of the target user display interface is not limited in the embodiments of the present disclosure. For example, it may be the client corresponding to the target user display interface or a background server corresponding to the live video page.

Based on the relevant content of step 17, for a guest end corresponding to a co-hosting guest, at least one candidate description content is displayed on a live video page of the guest end. After receiving a selection operation on target content in the candidate description content, the guest end may first generate target type setting information of the target user display interface based on the target content. Then, the target type setting information of the target user display interface is sent to a corresponding receiving device, for example, the client corresponding to the target user display interface or the background server corresponding to the live video page). Thus, the receiving device may update target type attribution information of the target user display interface by using the target type setting information of the target user display interface, such that the updated target type attribution information records the target type setting information of the target user display interface.

Based on the relevant content of scenario 2, for a guest end corresponding to a co-hosting guest in a live room, an interaction page is displayed on a live video page of the guest end, the interaction page may not only include at least one virtual gift (for example, Gift 1, Gift 2 and the like shown in FIG. 4), but also include a target type setting control (for example, a control 404 shown in FIG. 4). A holder (for example, the co-hosting guest) of the guest end may not only send the gift to the client (for example, other co-hosting guests or the anchor) corresponding to the target user display interface, but also perform some user type adjustment processing on the client corresponding to the target user display interface by means of the interaction interface. Therefore, interaction requirements of the co-hosting guest in the live room can be better satisfied, and a user experience of the co-hosting guest can be improved.

In scenario 3, for an audience in a live room, the audience may not only send a gift to any co-hosting guest or the anchor in the live room, but also perform the following operations on any co-hosting guest or the anchor: adjusting a type of the co-hosting guest or a type of the anchor.

Based on this, the above interaction requirements of the audience are similar to those of the co-hosting guest above. Thus, an interaction interface displayed on an audience end held by the audience is similar to that displayed on the guest end above. Therefore, in the case that the interaction method according to an embodiment of the present disclosure is applied to an audience end, at least one management control in the interaction interface displayed on the audience end includes a target type setting control (for example, a control 404 shown in FIG. 4).

Since the at least one management control displayed on the audience end is similar to that displayed on the guest end above, the implementation of S4 on the audience end is similar to the implementation of S4 on the guest end above (for example, steps 16 to 17), which will not be described here for brevity.

Based on the relevant content of scenario 3, for an audience end corresponding to an audience in a live room, an interaction page is displayed on a live video page of the audience end, the interaction page may include at least one virtual gift (for example, Gift 1, Gift 2 and the like shown in FIG. 4), as well as a target type setting control (for example, a control 404 shown in FIG. 4). Thus, a holder (e.g. the audience) of the audience end may send the gift to a client (for example, a co-hosting guest or an anchor) corresponding to the target user display interface by means of the interaction interface. Furthermore, the holder may perform some user type adjustment processing on the client corresponding to the target user display interface by means of the interaction interface. Therefore, interaction requirements of the audience in the live room can be better satisfied, and a user experience of the audience can be improved.

Based on the relevant content of scenarios 1 to 3, for a live room, since clients with different live room role description information have different interaction requirements, at least one management controls displayed on the clients with different live room role description information are different. Based on this, a possible implementation of a process for determining "at least one management control" is further provided according to an embodiment of the present disclosure, which may specifically include: determining the at least one management control, based on live room role description information of a client corresponding to the live video page.

The client corresponding to the live video page refers to a display device of the live video page. For example, if the live video page is displayed on an anchor end of a live streaming, the client corresponding to the live video page is the anchor end of the live streaming. If the live video page is displayed on a guest end, the client corresponding to the live video page is the guest end. If the live video page is displayed on an audience end, the client corresponding to the live video page is the audience end.

The "live room role description information of a client corresponding to the live video page" is used to describe a user type of the client corresponding to the live video page in the live room. For example, if the client corresponding to the live video page is the anchor end of the live streaming, the live room role description information of the client corresponding to the live video page may include a character string "anchor". If the client corresponding to the live video page is the guest end, the live room role description information of the client corresponding to the live video page may include a character string "co-hosting guest". If the client corresponding to the live video page is the audience end, the live room role description information of the client corresponding to the live video page may include a character string "audience".

In addition, the implementation of the above step of "determining the at least one management control based on live room role description information of a client corresponding to the live video page" is not limited in the embodiments of the present disclosure. For example, it may specifically include: searching candidate controls corresponding to the "live room role description information of a client corresponding to the live video page" from a preset mapping relationship; and determining the searched candidate controls as management controls, to display the management controls in an interaction page of the live video page. The mapping relationship is used to record at least one candidate control corresponding to live room role description information.

Based on the relevant content of the process for determining the "at least one management control", for an executive subject (for example, an anchor end of a live streaming, a guest end, or an audience end) of the interaction method according to the embodiment of the present disclosure, a live video page is displayed on the executing subject, and at least one candidate user display interface is displayed on the live video page. After receiving a trigger operation on a target user display interface in the candidate user display interfaces, the executive subject may determine at least one management control based on the live room role description information of the client corresponding to the live video page, such that the management controls may satisfy interaction requirements of a holder of the client as much as possible. Then, the executive subject may display an interaction page deployed with the management control on the live video page. Thus, the holder of the executive subject may manage the client corresponding to the target user display interface by means of the management control. Therefore, state management requirements of different users in the live room can be satisfied, and a user experience can be improved.

Based on the relevant content of the "at least one management control", for an electronic device used by any participant (for example, an anchor, a co-hosting guest or an audience) in a live room, a live video page (for example, a live streaming co-hosting page) is displayed on the electronic device, and the live video page includes at least one candidate user display interface (for example, an anchor display page, co-hosting display pages of respective co-hosting guests, etc.). In this case, after receiving a trigger operation on a target user display interface (for example, a co-hosting display page of a co-hosting guest, etc.) in the candidate user display interfaces, the electronic device may display an interaction interface on the live video page, and some virtual gifts and some management controls are deployed on the interaction interface. Thus, interaction requirements of a holder of the electronic device can be satisfied by means of the objects displayed on the interaction interface, which is beneficial to improving a user experience.

In fact, for a live streaming co-hosting scenario, users in the live room sometimes have some other requirements, for example, following a co-hosting guest or an anchor.

Based on the above requirements, another possible implementation of the interaction interface is further provided according to an embodiment of the present disclosure. In this implementation, in the case that the interaction method according to the embodiment of the present disclosure is applied to an anchor end of a live streaming, a guest end or an audience end, if a preset display condition is satisfied, the interaction interface may further include a following state adjustment control (for example, a control 303 shown in FIG. 3 or a control 403 shown in FIG. 4).

The preset display condition refers to a trigger condition for displaying the following state adjustment control.

In addition, the preset display condition is not limited in the embodiments of the present disclosure. For example, it may be that the client corresponding to the live video page (that is, the executive subject of the interaction method according to the embodiment of the present disclosure) does not follow the client corresponding to the target user display interface.

For an executive subject (for example, an anchor end of a live streaming, a guest end, or an audience end) of the interaction method according to the embodiment of the present disclosure, a live video page is displayed on the executive subject. If the executive subject determines that a client corresponding to the live video page still does not follow the client corresponding to the target user display interface, it may be determined that a holder of the executive subject may have a requirement to follow a user account corresponding to the target user display interface. Therefore, a following state adjustment control may be deployed on an interaction page displayed on the live video page, such that the following requirement of the holder for the user account corresponding to the target user display interface may be satisfied by means of the following state adjustment control.

The "following state adjustment control" is used to trigger a following process for the client corresponding to the target user display interface. Furthermore, working principle of the following state adjustment control is not limited in the embodiments of the present disclosure. For example, it may specifically include the following step 18. An execution time of step 18 is later than an execution time of S2, which will not be limited in the embodiments of the present disclosure.

In step 18, a following relationship is established and display of the following state adjustment control is removed on the live video page, in response to a trigger operation on the follow state adjustment control, where the following relationship is used to indicate that the client corresponding to the live video page has followed the client corresponding to the target user display interface.

In an embodiment of the present disclosure, for an executive subject (for example, an anchor end of a live streaming, a guest end, or an audience end) of the interaction method according to the embodiment of the present disclosure, an interaction page is displayed on a live video page of the executive subject, and a following state adjustment control (for example, a control 303 shown in FIG. 3 or a control 403 shown in FIG. 4) is deployed on the interaction page. If receiving a trigger operation (e.g., a click operation) on the following state adjustment control, the executive subject may establish a following relationship. The following relationship may indicate that the client corresponding to the live video page has followed the client corresponding to the target user display interface. Then, display of the following state adjustment control may be removed on the live video page, such that a viewer of the live video page may know from the live video page that he has successfully followed the client corresponding to the target user display interface. Therefore, the following requirement of the user in the live room for the co-hosting guest or the anchor can be realized.

Based on the relevant content of the following state adjustment control, for an executive subject (for example, an anchor end of a live streaming, a guest end, or an audience end) of the interaction method according to the embodiment of the present disclosure, an interaction page is displayed on a live video page of the executive subject, and a following state adjustment control (for example, a control 303 shown in FIG. 3 or a control 403 shown in FIG. 4) is deployed on the interaction page. In this case, a holder of the executive subject may follow the client corresponding to the target user display interface by means of the following state adjustment control. Therefore, a following requirement of a user in the live room for a co-hosting guest or an anchor can be realized, and thus a user experience can be improved.

In fact, for a live streaming co-hosting scenario, users in the live room sometimes have some other requirements, for example, knowing about relevant information on a co-hosting guest or an anchor.

Based on the above requirements, another possible implementation of the interaction interface is further provided according to an embodiment of the present disclosure. In this implementation, in the case that the interaction method according to the embodiment of the present disclosure is applied to an anchor end of a live streaming, a guest end or an audience end, the interaction interface may further include a user identification (for example, a user avatar 301 and a user nickname 302 shown in FIG. 3, or a user avatar 401 and a user nickname 402 shown in FIG. 4) corresponding to the target user display interface. The user identification is used to identify a client corresponding to the target user display interface. Furthermore, the user identification is not limited in the embodiments of the present disclosure. For example, it may include at least one of a user avatar and a user nickname.

In addition, a function of the "user identification corresponding to the target user display interface" is not limited in the embodiments of the present disclosure. For example, it at least includes a function shown in the following step 19. An execution time of step 19 is later than an execution time of S2, which will not be limited in the embodiments of the present disclosure.

In step 19, if the user identification corresponding to the target user display interface is displayed in the interaction interface, an information introduction page corresponding to the user identification is displayed in response to a trigger operation on the user identification.

The "information introduction page corresponding to the user identification" is used to introduce relevant content of the client corresponding to the target user display interface. Furthermore, the "information introduction page corresponding to the user identification" is not limited in the embodiments of the present disclosure. For example, it may be a user homepage corresponding to the user identification.

In addition, a display mode of the "information introduction page corresponding to the user identification" is not limited in the embodiments of the present disclosure. For example, it may be displayed by a page jumping mode (that is, jumping from the live video page to the information introduction page corresponding to the user identification for display). For another example, it may also be displayed by a drop-down page (that is, directly displaying the information introduction page corresponding to the user identification on the live video page).

Based on the relevant content of step 19, for an executive subject (for example, an anchor end of a live streaming, a guest end, or an audience end) of the interaction method according to the embodiment of the present disclosure, an interaction page is displayed on a live video page of the executive subject, and a user identification corresponding to a target user display interface is deployed on the interaction page. If receiving a trigger operation on the user identification (for example, a user avatar 301 and a user nickname 302 shown in FIG. 3, or a user avatar 401 and a user nickname 402 shown in FIG. 4), the executive subject may directly display an information introduction page corresponding to the user identification. Thus, a holder of the executive subject may know some the relevant content on the client corresponding to the target user display interface from the information introduction page. Therefore, a requirement of a user in the live room to know the relevant content on a co-hosting guest or an anchor can be satisfied.

Based on the relevant content of the user identification corresponding to the target user display interface, for an executive subject (for example, an anchor end of a live streaming, a guest end, or an audience end) of the interaction method according to the embodiment of the present disclosure, an interaction page is displayed on a live video page of the executing subject, and the user identification corresponding to the target user display interface is deployed on the interaction page. In this case, a holder of the executive subject may not only know from the interaction page that a target of the interaction page is the client corresponding to the target user display interface, but also access an information introduction page of the client corresponding to the target user display interface by means of the user identification. Thus, the holder may know some relevant content on the client corresponding to the target user display interface, from the information introduction page. Therefore, a requirement of a user in the live room to know the relevant content on a co-hosting guest or an anchor can be satisfied, which is beneficial to improving a user experience.

Based on the interaction method according to the embodiment of the present disclosure, an interaction apparatus is further provided according to an embodiment of the present disclosure, which is explained and illustrated below with reference to the drawings. It should be noted that, for technical details of the interaction apparatus according to the embodiment of the present disclosure, reference may be made to the relevant content of the above interaction method.

Figure 7:
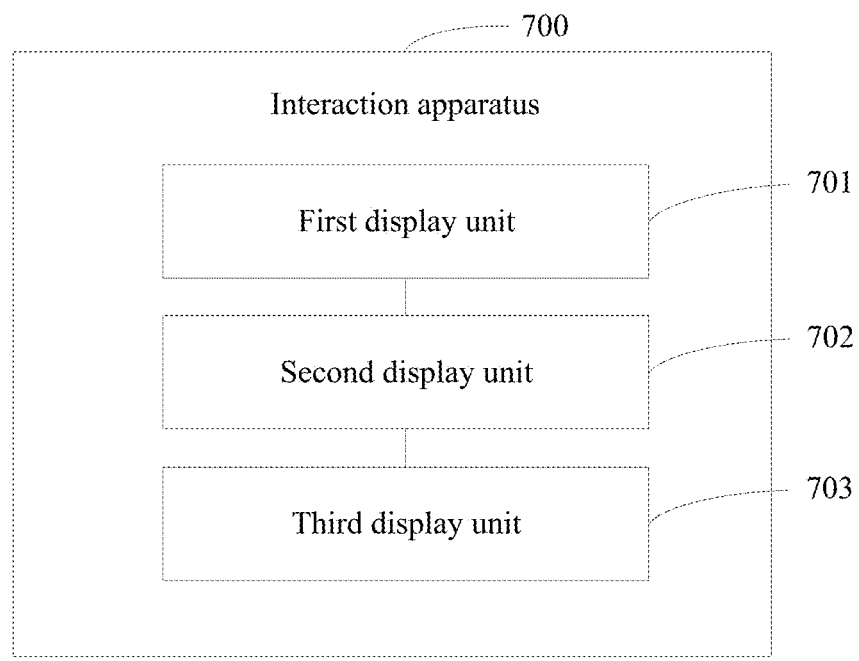
FIG. 7 is a schematic structural diagram of an interaction apparatus according to an embodiment of the present disclosure.

Reference is made to FIG. 7, which is a schematic structural diagram of an interaction apparatus according to an embodiment of the present disclosure.

An interaction apparatus 700 according to an embodiment of the present disclosure includes a first display unit 701, a second display unit 702 and a third display unit 703.

The first display unit 701 is configured to display a live video page, where the live video page includes at least one candidate user display interface.

The second display unit 702 is configured to display an interaction interface on the live video page in response to a trigger operation on a target user display interface in the at least one candidate user display interface, where the interaction interface includes at least one virtual gift.

The third display unit 703 is configured to send a target gift in the at least one virtual gift to a client corresponding to the target user display interface, in response to a trigger operation on the target gift.

In a possible embodiment, the interaction interface further includes at least one management control.

The interaction apparatus 700 further includes a state adjustment unit.

The state adjustment unit is configured to adjust state information of the client corresponding to the target user display interface, in response to a trigger operation on a to-be-used control in the at least one management control.

In a possible embodiment, the interaction method is applied to an anchor end of a live streaming; and the at least one management control includes at least one of: at least one co-hosting presentation state adjustment control, a becoming-audience control and an operation selection control. The at least one co-hosting presentation state adjustment control is used to adjust a co-hosting presentation state corresponding to the target user display interface. The becoming-audience control is used to disconnect a co-hosting relationship between the anchor end and the client corresponding to the target user display interface. The operation selection control is used to manage a selection state of at least one candidate operation option for the client corresponding to the target user display interface.

In a possible embodiment, the state adjustment unit includes a first adjustment sub-unit.

The first adjustment sub-unit is configured to adjust a co-hosting presentation state corresponding to the target user display interface on the live video page, in response to a trigger operation on a target control in the at least one co-hosting presentation state adjustment control.

In a possible embodiment, the first adjustment sub-unit is specifically configured to adjust the co-hosting presentation state corresponding to the target user display interface from a first co-hosting state to a second co-hosting state on the live video page, in a case that the target control is in a first display state, where the target control is a video control, the first display state indicates that the client corresponding to the target user display interface is in a camera enabling state, the first co-hosting state includes a camera enabling state, and the second co-hosting state includes a camera disabling state; or the target control is a voice control, the first display state indicates that the client corresponding to the target user display interface is in a microphone enabling state, the first co-hosting state includes a microphone enabling state, and the second co-hosting state includes a microphone disabling state.

In a possible embodiment, the first adjustment sub-unit is specifically configured to send a co-hosting presentation state adjustment request to the client corresponding to the target user display interface, in a case that the target control is in a second display state, where the co-hosting presentation state adjustment request is used to request that the co-hosting presentation state corresponding to the target user display interface is adjusted from a third co-hosting state to a fourth co-hosting state; the target control is a video control, the second display state indicates that the client corresponding to the target user display interface is in a camera disabling state, the third co-hosting state includes a camera disabling state, and the fourth co-hosting state includes a camera enabling state; or the target control is a voice control, the second display state indicates that the client corresponding to the target user display interface is in a microphone disabling state, the third co-hosting state includes a microphone disabling state, and the fourth co-hosting state includes a microphone enabling state.

In a possible embodiment, the state adjustment unit includes a first display sub-unit and a second adjustment sub-unit.

The first display sub-unit is configured to display becoming-audience confirmation information in response to a trigger operation on the becoming-audience control.

The second adjustment sub-unit is configured to remove display of the target user display interface from a video play page, in response to a preset operation triggered for the becoming-audience confirmation information.

In a possible embodiment, the state adjustment unit includes a second display sub-unit and a third adjustment sub-unit.

The second display sub-unit is configured to display at least one candidate operation option, in response to a trigger operation on the operation selection control.

The third adjustment sub unit is configured to adjust user description information of the target user display interface, in response to a selection operation on a target option in the at least one candidate operation option.

In a possible embodiment, the at least one co-hosting presentation state adjustment control includes at least one of a video control and a voice control.

In a possible embodiment, the at least one management control is determined based on live room role description information of a client corresponding to the live video page.

In a possible embodiment, in a case that a preset display condition is satisfied, the interaction interface further includes a following state adjustment control.

The interaction apparatus 700 further includes a following unit.

The following unit is configured to establish a following relationship and remove display of the following state adjustment control on the live video page, in response to a trigger operation on the following state adjustment control, where the following relationship indicates that a client corresponding to the live video page has followed the client corresponding to the target user display interface.

In a possible embodiment, the interaction interface further includes a user identification corresponding to the target user display interface.

The interaction apparatus 700 further includes a fourth display unit.

The fourth display unit is configured to display an information introduction page corresponding to the user identification, in response to a trigger operation on the user identification.

In a possible embodiment, the interaction method is applied to a first client; the at least one candidate user display interface includes a candidate user display interface corresponding to the first client and a candidate user display interface corresponding to at least one second client; and
 the second display unit 702 is specifically configured to display the interaction interface on the live video page, in response to the trigger operation on the target user display interface in the candidate user display interface corresponding to the at least one second client.

Based on the relevant content of the interaction apparatus 700, for the interaction apparatus 700 according to the embodiment of the present disclosure, the interaction apparatus 700 may be deployed in an electronic device used by any participant (for example, an anchor, a co-hosting guest or an audience) in the live room. The working principle of the interaction apparatus 700 is as follows. When a live video page (for example, a live streaming co-hosting page) is displayed on the interaction apparatus 700 and the live video page includes at least one candidate user display interface (for example, an anchor display page, co-hosting display pages of respective co-hosting guests), after the interaction apparatus 700 receives a trigger operation on a target user display interface (for example, a co-hosting display page of a certain co-hosting guest and the like) in the candidate user display interfaces, the interaction apparatus 700 may display an interaction interface on the live video page, and some usable virtual gifts are deployed on the interaction interface. In this way, after the interaction apparatus 700 receives a trigger operation on a target gift in the virtual gifts, the interaction apparatus 700 may send the target gift to a client (for example, an anchor end or a guest end) corresponding to the target user display interface. Thus, the client corresponding to the target user display interface is able to receive the gift from the participant through the live video page. Therefore, a purpose of the participant sending the gift to the anchor or any co-hosting guest in the live room can be realized, and a process of the participant in sending the gift to the anchor or any co-hosting guest in the live room can be simplified, so that a gift sending enthusiasm of the participant can be improved, and a user experience (especially a gift sending experience) of the participant can be improved.

In addition, an electronic device is further provided according to an embodiment of the present disclosure. The device includes a processor and a memory. The memory is configured to store instructions or computer programs. The processor is configured to execute the instructions or the computer programs in the memory, to cause the electronic device to implement any embodiment of the interaction method according to the embodiments of the present disclosure.

Figure 8:
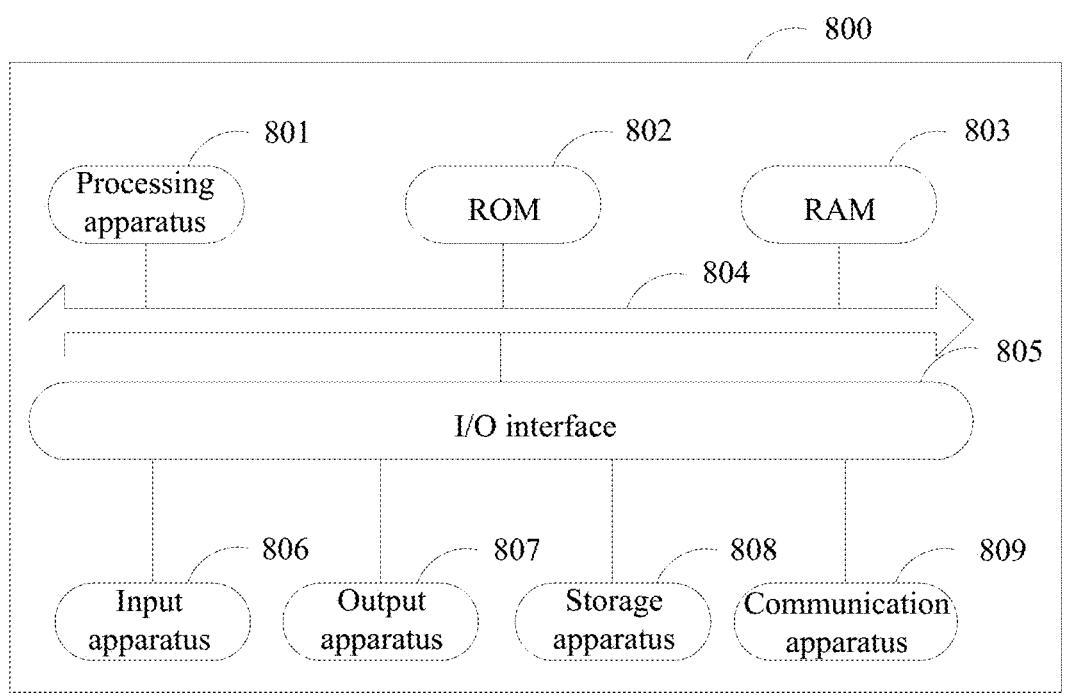
FIG. 8 is a schematic structural diagram of an electronic device according to an embodiment of the present disclosure.

Reference is made to FIG. 8, which is a schematic structural diagram of an electronic device 800 applicable to implement the embodiments of the present disclosure. The terminal device according to the embodiments of the present disclosure may include but is not limited to mobile phones, laptops, digital broadcast receivers, PDAs (personal digital assistants), PADs (tablets), PMPs (portable multimedia players), vehicle-mounted terminals (such as in-vehicle navigation terminals) and other mobile terminals and fixed terminals such as digital TVs and desktop computers. The electronic device shown in FIG. 8 is only exemplary, and should not indicate any limitation to the function and scope of application of the embodiments of the present disclosure.

As shown in FIG. 8, the electronic device 800 may include a processing apparatus 801, such as a central processing unit or a graphics processor, which may execute various operations and processing based on a program stored in a Read Only Memory (ROM) 802 or a program loaded from a storage apparatus 808 into a Random Access Memory (RAM) 803. Various programs and data are stored in the RAM 803, which are required by the electronic device 800 to perform an operation. The processing apparatus 801, the ROM 802 and the RAM 803 are connected to each other through a bus 804. An input/output (I/O) interface 805 is also connected to the bus 804.

Generally, the I/O interface 805 may be connected to: an input apparatus 806, such as a touch screen, a touch panel, a keyboard, a mouse, a camera, a microphone, an accelerometer, and a gyroscope; an output apparatus 807, such as a liquid crystal display (LCD), a speaker, and a vibrator; a storage apparatus 808 such as a magnetic tape and a hard disk; and a communication apparatus 809. The communication apparatus 809 enables wireless or wired communication between the electronic device 800 and other devices for data exchanging. Although FIG. 8 shows an electronic device 800 having various components, it should be understood that the illustrated components are not necessarily required to all be implemented or included. Alternatively, more or fewer components may be implemented or included.

Particularly, according to the embodiments of the present disclosure, the process described above in conjunction with flowcharts may be implemented as a computer software program. For example, a computer program product is further provided as an embodiment in the present disclosure, including a computer program carried on a non-transitory computer readable medium. The computer program includes program code for performing the method shown in the flowchart. In the embodiment, the computer program may be downloaded and installed from the network via the communication apparatus 809, or installed from the storage apparatus 808, or installed from the ROM 802. When the computer program is executed by the processing apparatus 801, the functions defined in the method according to the embodiment of the present disclosure are performed.

The electronic device according to the embodiment of the present disclosure and the method according to the above embodiments belong to a same inventive concept. For technical details not described in detail in the embodiment, reference may be made to the above embodiments, and the embodiment has the same beneficial effects as the above embodiments.

A computer readable medium is further provided according to an embodiment of the present disclosure. The computer readable medium stores instructions or computer programs. The instructions or the computer programs, when executed on a device, cause the device to perform any embodiment of the interaction method according to the embodiments of the present disclosure.

It is to be noted that, the computer readable medium mentioned herein may be a computer readable signal medium or a computer readable storage medium or any combination thereof. The computer readable storage medium may for example be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read only memory (ROM), an erasable programmable read only memory (EPROM or flash memory), an optical fiber, a portable compact disc read only memory (CD-ROM), a light storage device, a magnetic storage device or any proper combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and may send, propagate or transmit programs to be used by or in combination with an instruction execution system, apparatus or device. The program codes included in the computer readable medium may be transmitted via any proper medium including but not limited to: a wire, an optical cable, radio frequency (RF) and the like, or any proper combination thereof.

In some embodiments, the client and the server may communicate using any currently known or future developed network protocol such as Hyper Text Transfer Protocol (HTTP), and may be interconnected with any form or medium of digital data communication (e.g., a communication network). Examples of the communication network include a local area network ("LAN"), a wide area network ("WAN"), the internet (e.g., the Internet), and an end-to-end network (e.g., ad hoc end-to-end network) or any of a currently known or a future developed network.

The computer readable medium may be incorporated in the electronic device, or may exist alone without being assembled into the electronic device.

The computer readable medium carries one or more programs. The one or more programs, when executed by the electronic device, cause the electronic device to implement the above method.

The computer program codes for performing the operations disclosed in the present disclosure may be written in one or more programming languages or combinations thereof. The programming languages include but are not limited to an object-oriented programming language, such as Java, Smalltalk, and C++, and a conventional procedural programming language, such as C language or a similar programming language. The program codes may be executed entirely on a user computer, partially on the user computer, as an standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flowcharts and block diagrams in the drawings illustrate the architecture, functions and operations that may be implemented by the system, method and computer program product according to the embodiments of the present disclosure. In this regard, each block in the flowcharts or the block diagrams may represent a module, a program segment, or a part of code. The module, the program segment, or the part of code contains one or more executable instructions for implementing the specified logical function. It should be also noted that, in some alternative implementations, the functions shown in the blocks may be performed in an order different from the order shown in the drawings. For example, two blocks shown in succession may actually be executed in parallel, or sometimes may be executed in a reverse order, which depends on the functions involved. It should also be noted that, each block in the block diagrams and/or the flowcharts and a combination of blocks in the block diagrams and/or the flowcharts may be implemented by a dedicated hardware-based system performing specified functions or operations, or may be implemented by a combination of dedicated hardware and computer instructions.

The units mentioned in the description of the embodiments of the present disclosure may be implemented by means of software, or otherwise by means of hardware. The name of the unit/module does not constitute a limitation on the unit itself under certain circumstances.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the present disclosure, a machine readable medium may be a tangible medium, which may contain or store a program used by the instruction execution system, apparatus, or device or a program used in combination with the instruction execution system, apparatus, or device. The machine readable medium may be a machine readable signal medium or a machine readable storage medium. The machine readable medium may include, but is not limited to, a system, an apparatus or a device in an electronic, magnetic, optical, electromagnetic, infrared, or semi-conductive form, or any suitable combination thereof. The machine readable storage medium, for example, includes an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination thereof.

It should be noted that embodiments in this specification are described in a progressive manner. Each embodiment focuses on differences from other embodiments, and reference may be made among these embodiments with respect to the same or similar parts. Since the system or the apparatus disclosed in the embodiments corresponds to the method disclosed in the embodiment, the description for the system or the apparatus is simple, and reference may be made to the embodiment of the method for the relevant parts.

It should be understood that in the present disclosure, the term "at least one" refers to a quantity equal to one or more, and the term "multiple" refers to a quantity equal to two or more. The term "and/or" is used to describe an association relationship between objects, and indicates three possible relationships. For example, "A and/or B" may indicate a case that there is only A, a case that there is only B, and a case that there are both A and B. In each case, a quantity of A may be one or more, and a quantity of B may be one or more. The symbol "/" generally indicates that a former object and a latter object are associated by an "or" relationship. The term "at least one of" or a similar expression refers to "any combination of", including any combination consisting of a single item or multiple items. For example, at least one of a, b, or c may indicate: a, b, c, "a and b", "a and c", "b and c", or "a, b, and c", where a, b, and c may be singular or plural.

It should be further noted that the relationship terminologies such as first, second or the like are only used herein to distinguish one entity or operation from another, rather than to necessitate or imply that the actual relationship or order exists between the entities or operations. In addition, terms of "include", "comprise" or any other variants thereof are intended to be non-exclusive. Therefore, a process, a method, an article or a device including a series of elements includes not only the elements but also other elements that are not enumerated, or also include elements inherent in the process, the method, the article or the device. Unless expressively limited otherwise, an element defined by a statement of "comprising (including) one . . . " does not exclude a case that other similar elements exist in the process, the method, the article or the device including the element.

The steps of the method or algorithm described in conjunction with the embodiments of the present disclosure may be implemented by hardware, software modules executed by a processor, or a combination thereof. The software modules may be arranged in a random access memory (RAM), a memory, a read only memory (ROM), an electrically programmable ROM, an electrically erasable programmable ROM, a register, a hard disk, a removable disk, a CD-ROM, or a storage medium in any other form known in the art.

Those skilled in the art may implement or practice the present disclosure based on the above descriptions of the disclosed embodiments. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. An interaction method, applied to a streamer end of a live streaming, comprising:

displaying a live video page, wherein the live video page comprises a plurality of user display interfaces;

displaying an interaction interface comprising a plurality of virtual gifts, in response to a trigger operation on a first user display interface in the plurality of user display interfaces; and sending a gift in the plurality of virtual gifts to a client corresponding to the first user display interface, in response to a trigger operation on the gift, wherein the interaction interface further comprises at least one management control, the at least one management control comprises at least one of: at least one co-hosting presentation state adjustment control, a becoming-audience control, and an operation selection control, and the method further comprises:

adjusting a co-hosting presentation state corresponding to the first user display interface on the live video page, in response to a trigger operation on a control in the at least one co-hosting presentation state adjustment control;

wherein the adjusting the co-hosting presentation state corresponding to the first user display interface on the live video page, in response to the trigger operation on the control in the at least one co-hosting presentation state adjustment control comprises:

sending a co-hosting presentation state adjustment request to the client corresponding to the first user display interface, in response to the trigger operation on the control, when the control is in a first display state, wherein the co-hosting presentation state adjustment request is used to request that the co-hosting presentation state corresponding to the first user display interface is adjusted from a first co-hosting state to a second co-hosting state; and wherein the control is a video control, the first display state indicates that the client corresponding to the first user display interface is in a camera disabling state, the first co-hosting state comprises the camera disabling state, and the second co-hosting state comprises a camera enabling state; or the control is a voice control, the first display state indicates that the client corresponding to the first user display interface is in a microphone disabling state, the first co-hosting state comprises the microphone disabling state, and the second co-hosting state comprises a microphone enabling state.

2. The method according to claim 1, the method further comprises:
adjusting state information of the client corresponding to the first user display interface, in response to a trigger operation on a to-be-used control in the at least one management control.

3. The method according to claim 2, wherein the adjusting state information of the client corresponding to the first user display interface, in response to the trigger operation on the to-be-used control in the at least one management control comprises:
displaying at least one operation option, in response to a trigger operation on the operation selection control; and
adjusting user description information of the first user display interface, in response to a selection operation on an option in the at least one operation option.

4. The method according to claim 2, wherein the at least one co-hosting presentation state adjustment control comprises at least one of a video control and a voice control.

5. The method according to claim 2, wherein the adjusting state information of the client corresponding to the first user display interface, in response to the trigger operation on the to-be-used control in the at least one management control comprises:
displaying becoming-audience confirmation information, in response to a trigger operation on the becoming-audience control; and
removing display of the first user display interface from the live video page, in response to a preset operation triggered for the becoming-audience confirmation information.

6. The method according to claim 1, wherein the adjusting the co-hosting presentation state corresponding to the first user display interface on the live video page, in response to the trigger operation on the control in the at least one co-hosting presentation state adjustment control comprises:
adjusting the co-hosting presentation state corresponding to the first user display interface from a third first co-hosting state to a fourth co-hosting state on the live video page, in response to the trigger operation on the control, when the control is in a second display state,
wherein the control is a video control, the second display state indicates that the client corresponding to the first user display interface is in the camera enabling state, the third co-hosting state comprises the camera enabling state, and the fourth co-hosting state comprises the camera disabling state; or
wherein the control is a voice control, the second display state indicates that the client corresponding to the first user display interface is in the microphone enabling state, the third co-hosting state comprises the microphone enabling state, and the fourth co-hosting state comprises the microphone disabling state.

7. The method according to claim 1, wherein the at least one management control is determined based on live room role description information of a client corresponding to the live video page.

8. The method according to claim 1, wherein in a case that a preset display condition is satisfied, the interaction interface further comprises a following state adjustment control; and
the method further comprises:
establishing a following relationship and removing display of the following state adjustment control on the live video page, in response to a trigger operation on the following state adjustment control, wherein the following relationship indicates that a client corresponding to the live video page has followed the client corresponding to the first user display interface.

9. The method according to claim 1, wherein the interaction interface further comprises a user identification corresponding to the first user display interface; and
the method further comprises:
displaying an information introduction page corresponding to the user identification, in response to a trigger operation on the user identification.

10. The method according to claim 1, wherein the interaction method is applied to a first client; the plurality of user display interfaces comprises the first user display interface corresponding to the first client and a second user display interface corresponding to at least one second client; and
the displaying the interaction interface on the live video page, in response to a trigger operation on the first user display interface in the plurality of user display interfaces comprises:
displaying the interaction interface on the live video page, in response to the trigger operation on the first user display interface in the second user display interface corresponding to the at least one second client.

11. An electronic device, applied to a streamer end of a live streaming, comprising:
a memory configured to store instructions or computer programs; and
a processor configured to execute the instructions or the computer programs in the memory, to cause the electronic device to:
display a live video page, wherein the live video page comprises a plurality of user display interfaces;
display an interaction interface comprising a plurality of virtual gifts, in response to a trigger operation on a first user display interface in the plurality of user display interfaces; and
send a gift in the plurality of virtual gifts to a client corresponding to the first user display interface, in response to a trigger operation on the gift,
wherein the interaction interface further comprises at least one management control, the at least one management control comprises at least one of: at least one co-hosting presentation state adjustment control, a becoming-audience control, and an operation selection control, and
wherein the processor is configured to execute the instructions or the computer programs in the memory, to cause the electronic device to:
adjust a co-hosting presentation state corresponding to the first user display interface on the live video page, in response to a trigger operation on a control in the at least one co-hosting presentation state adjustment control;
wherein the processor is configured to execute the instructions or the computer programs in the memory, to cause the electronic device further to:

send a co-hosting presentation state adjustment request to the client corresponding to the first user display interface, in response to the trigger operation on the control, when the control is in a first display state, wherein the co-hosting presentation state adjustment request is used to request that the co-hosting presentation state corresponding to the first user display interface is adjusted from a first co-hosting state to a second co-hosting state; and wherein the control is a video control, the first display state indicates that the client corresponding to the first user display interface is in a camera disabling state, the first co-hosting state comprises the camera disabling state, and the second co-hosting state comprises a camera enabling state; or the control is a voice control, the first display state indicates that the client corresponding to the first user display interface is in a microphone disabling state, the first co-hosting state comprises the microphone disabling state, and the second co-hosting state comprises a microphone enabling state.

12. The electronic device according to claim 11, wherein the processor is configured to execute the instructions or the computer programs in the memory, to cause the electronic device to:

adjust state information of the client corresponding to the first user display interface, in response to a trigger operation on a to-be-used control in the at least one management control.

13. The electronic device according to claim 12, wherein the processor is configured to execute the instructions or the computer programs in the memory, to cause the electronic device to:

display becoming-audience confirmation information, in response to a trigger operation on the becoming-audience control; and remove display of the first user display interface from the live video page, in response to a preset operation triggered for the becoming-audience confirmation information.

14. The electronic device according to claim 11, wherein the processor is configured to execute the instructions or the computer programs in the memory, to cause the electronic device to:

display at least one operation option, in response to a trigger operation on the operation selection control; and adjust user description information of the first user display interface, in response to a selection operation on an option in the at least one operation option.

15. A non-transitory computer readable medium storing instructions or computer programs, wherein the instructions or the computer programs, when executed by a device, cause the device to:

display a live video page, wherein the live video page comprises a plurality of user display interfaces;

display an interaction interface comprising a plurality of virtual gifts, in response to a trigger operation on a first user display interface in the plurality of user display interfaces; and send a gift in the plurality of virtual gifts to a client corresponding to the first user display interface, in response to a trigger operation on the gift, wherein the interaction interface further comprises at least one management control, the at least one management control comprises at least one of: at least one co-hosting presentation state adjustment control, a becoming-audience control, and an operation selection control, and wherein the instructions or the computer programs, when executed by the device, cause the device to:

adjust a co-hosting presentation state corresponding to the first user display interface on the live video page, in response to a trigger operation on a control in the at least one co-hosting presentation state adjustment control;

wherein the instructions or the computer programs, when executed by a device, cause the device further to:

send a co-hosting presentation state adjustment request to the client corresponding to the first user display interface, in response to the trigger operation on the control, when the control is in a first display state, wherein the co-hosting presentation state adjustment request is used to request that the co-hosting presentation state corresponding to the first user display interface is adjusted from a first co-hosting state to a second co-hosting state; and wherein the control is a video control, the first display state indicates that the client corresponding to the first user display interface is in a camera disabling state, the first co-hosting state comprises the camera disabling state, and the second co-hosting state comprises a camera enabling state; or the control is a voice control, the first display state indicates that the client corresponding to the first user display interface is in a microphone disabling state, the first co-hosting state comprises the microphone disabling state, and the second co-hosting state comprises a microphone enabling state.

* * * * *